Aug. 12, 1924.
F. L. FULLER
CASH REGISTER
Filed May 7, 1918     13 Sheets—Sheet 4
1,504,226
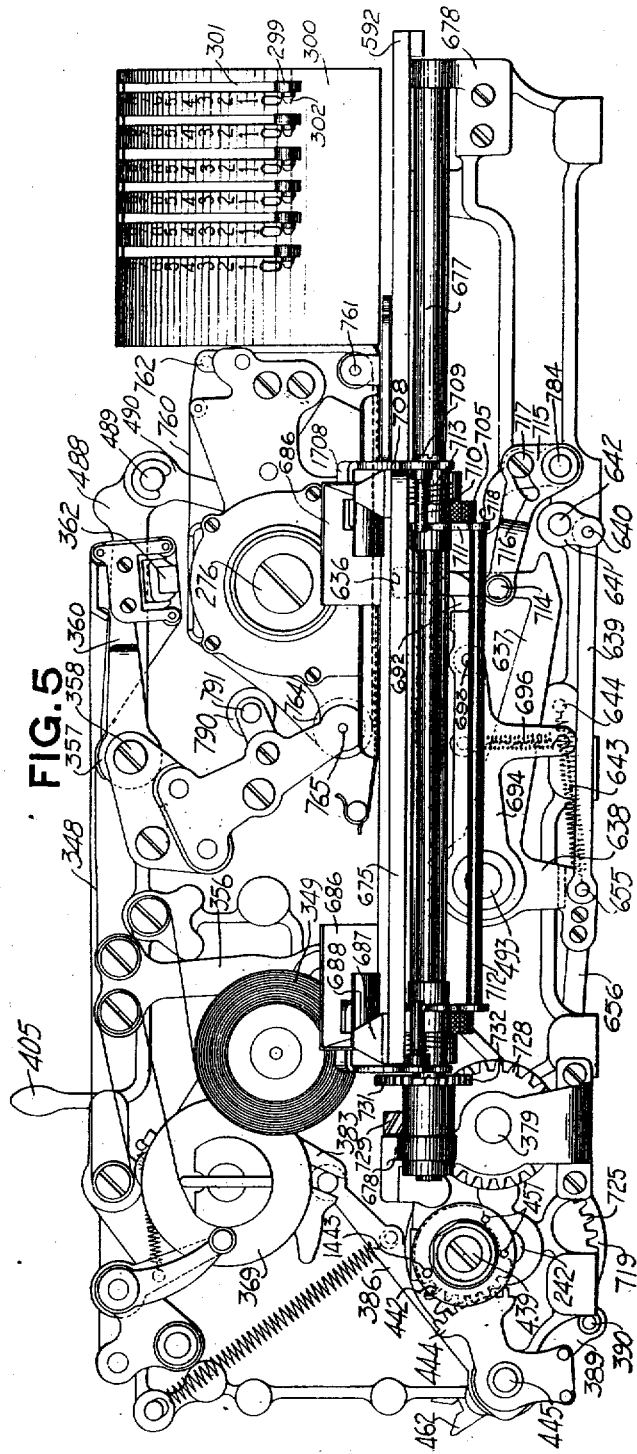
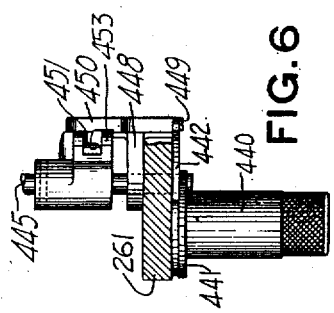
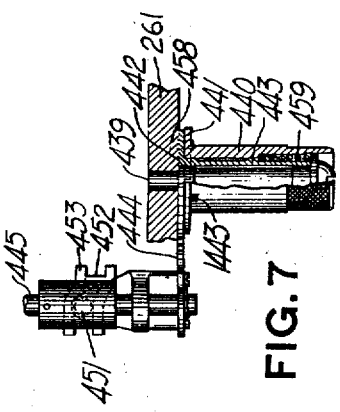
Inventor
FREDERICK L. FULLER
BY Carl Beust
Attorney

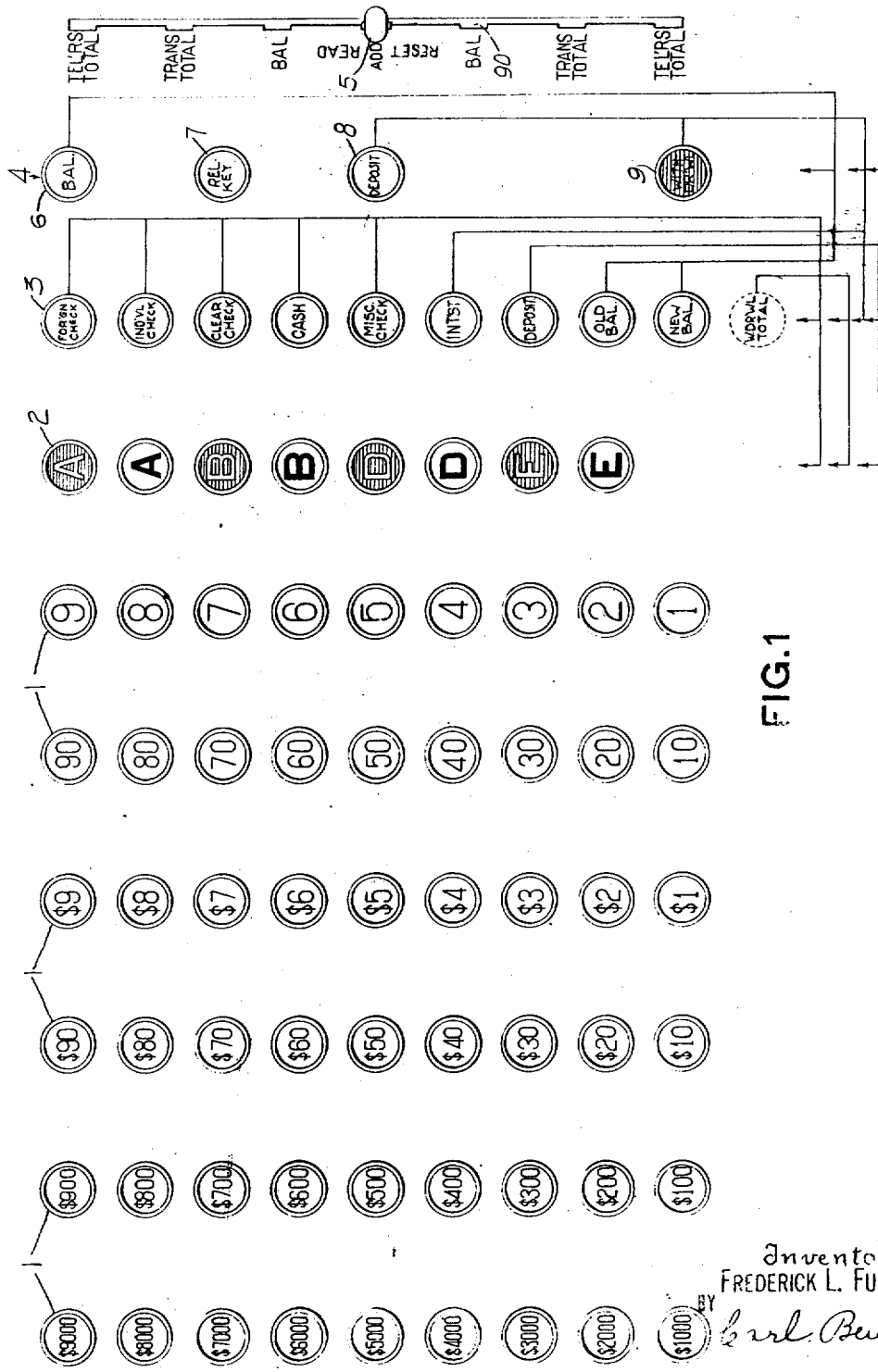

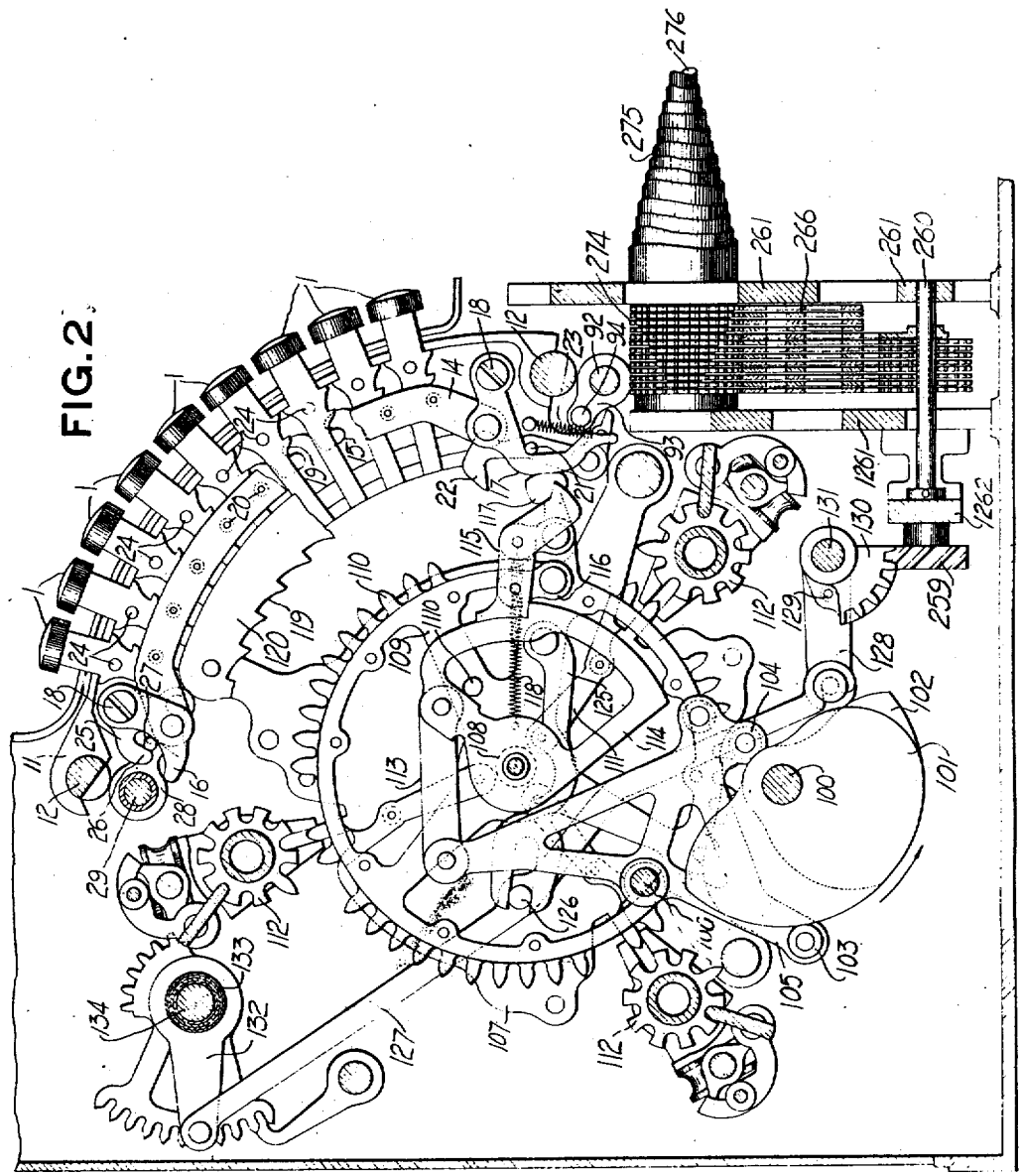

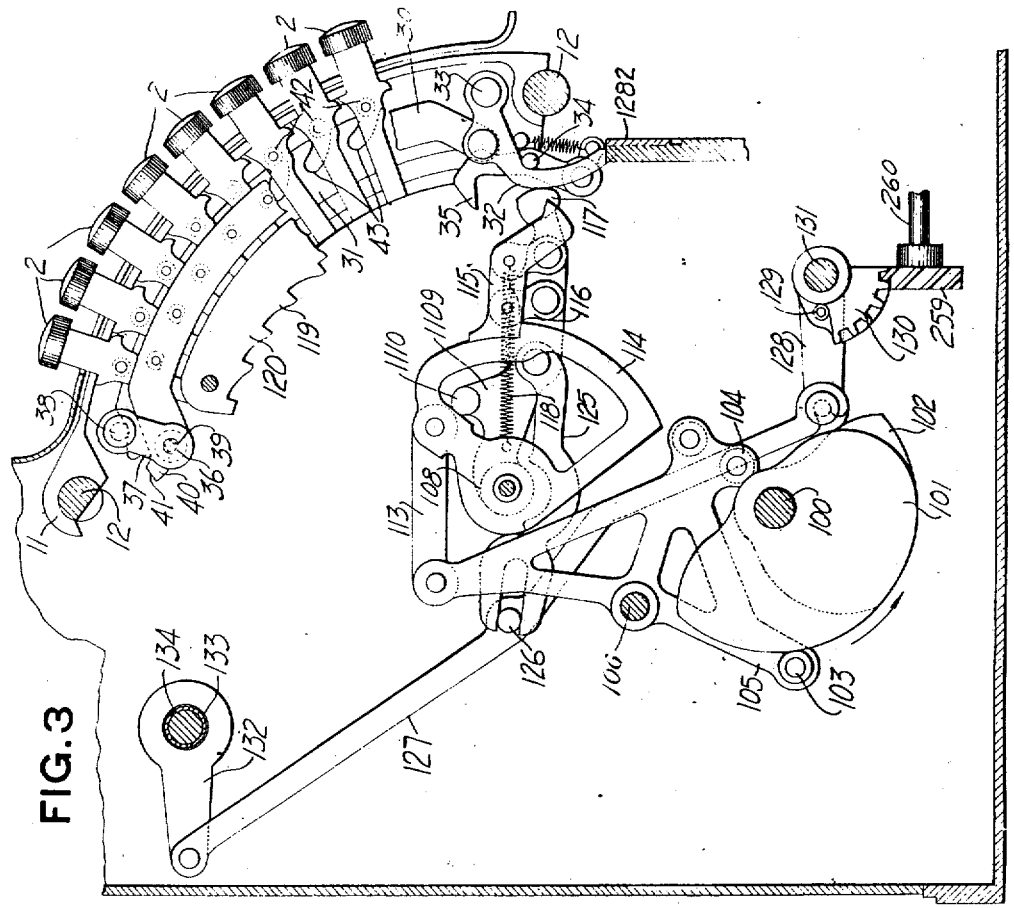
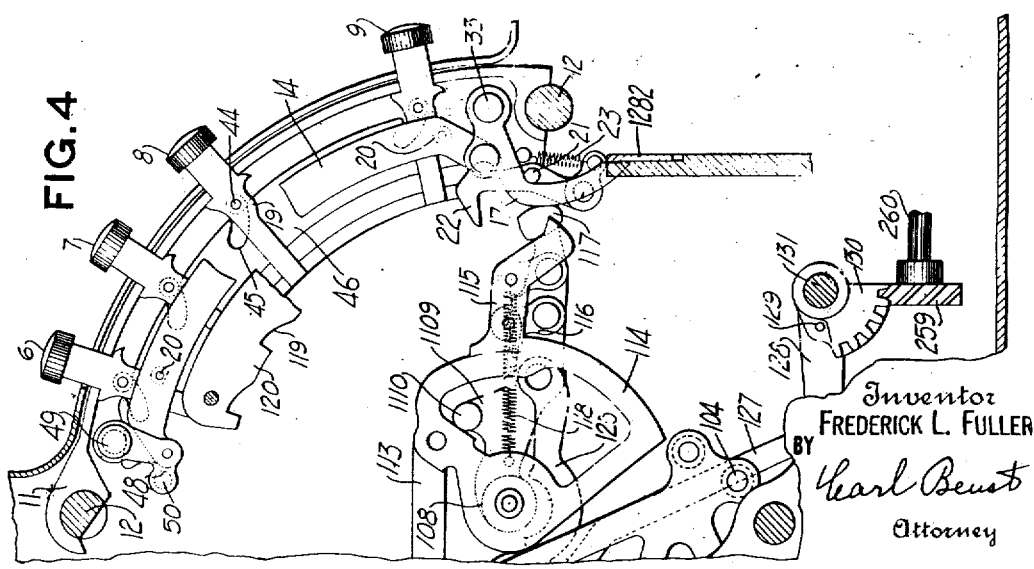

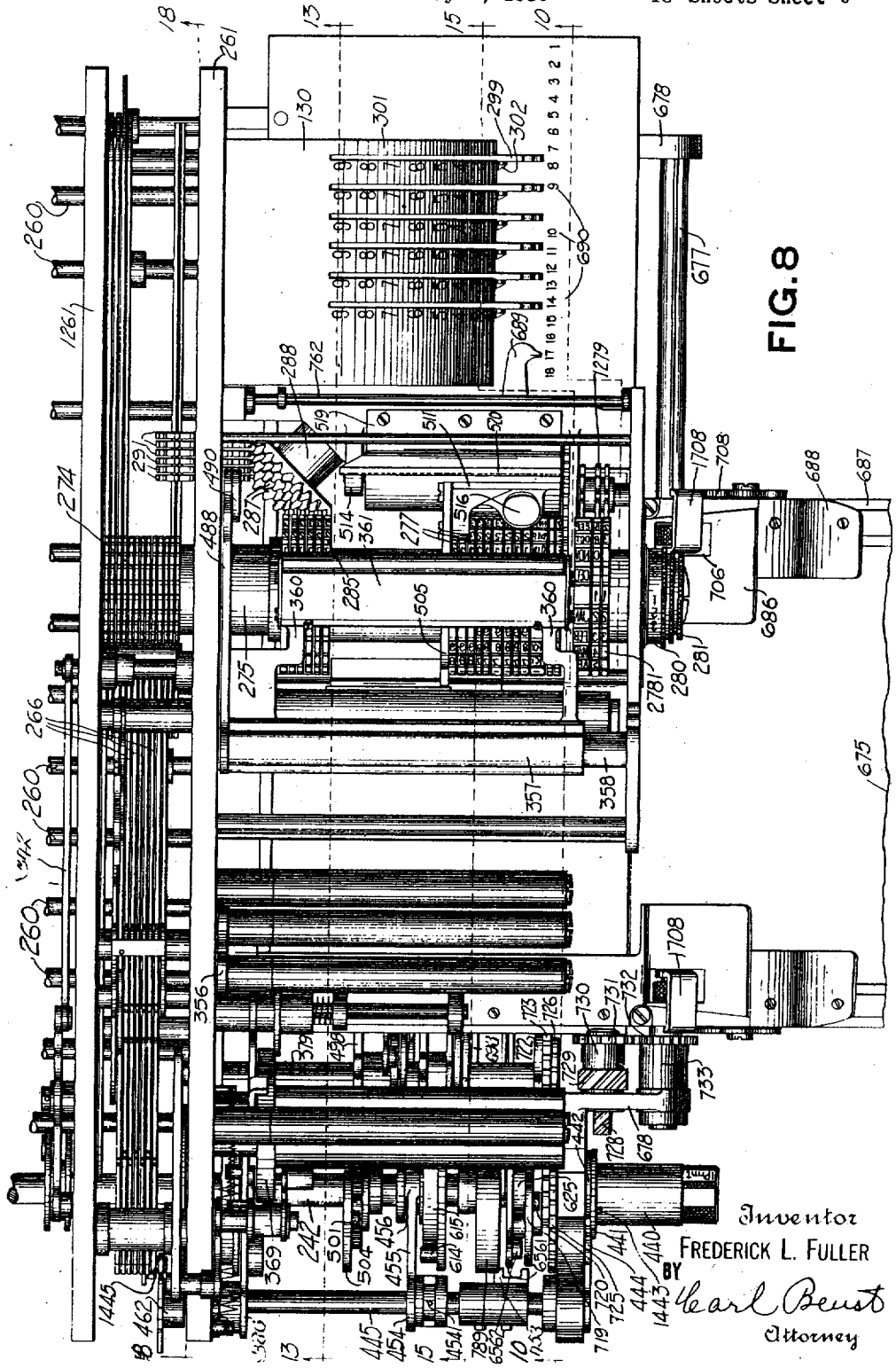

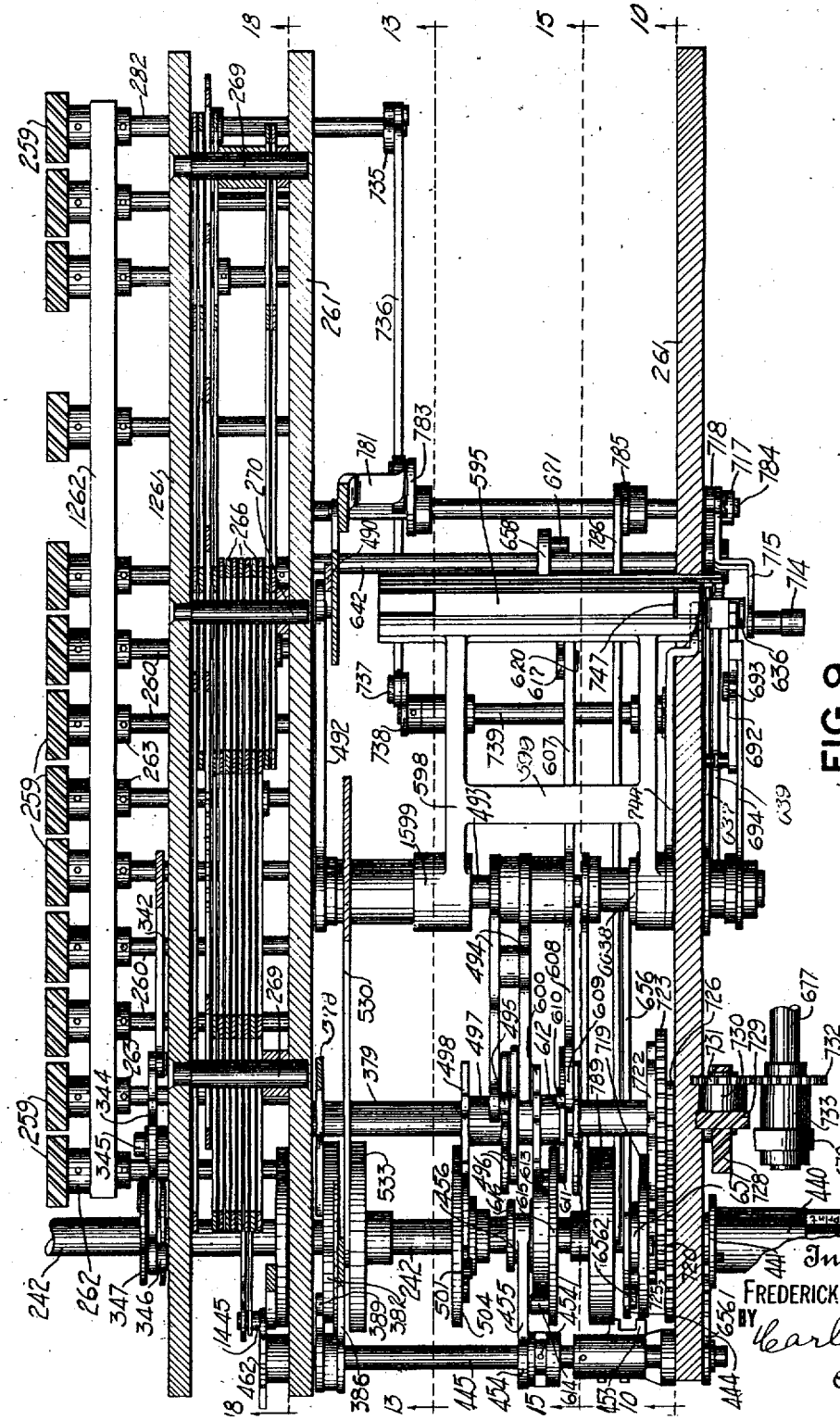

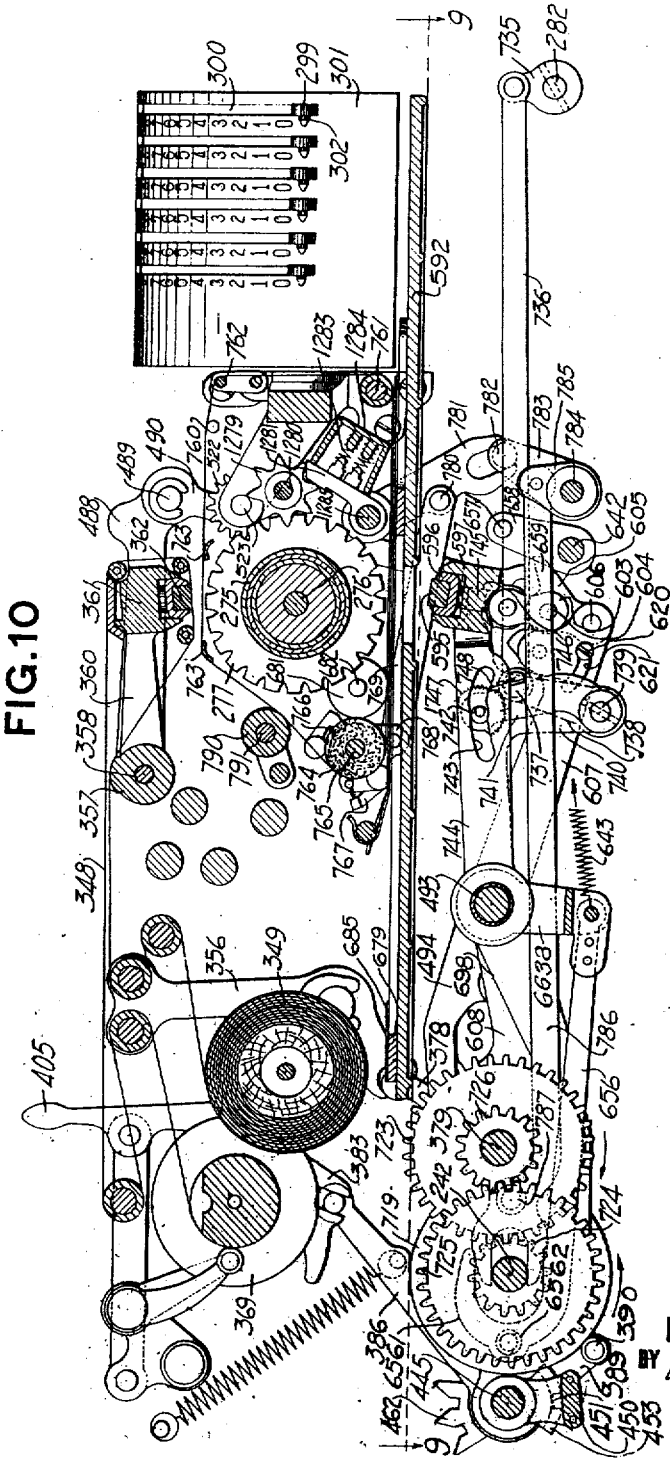

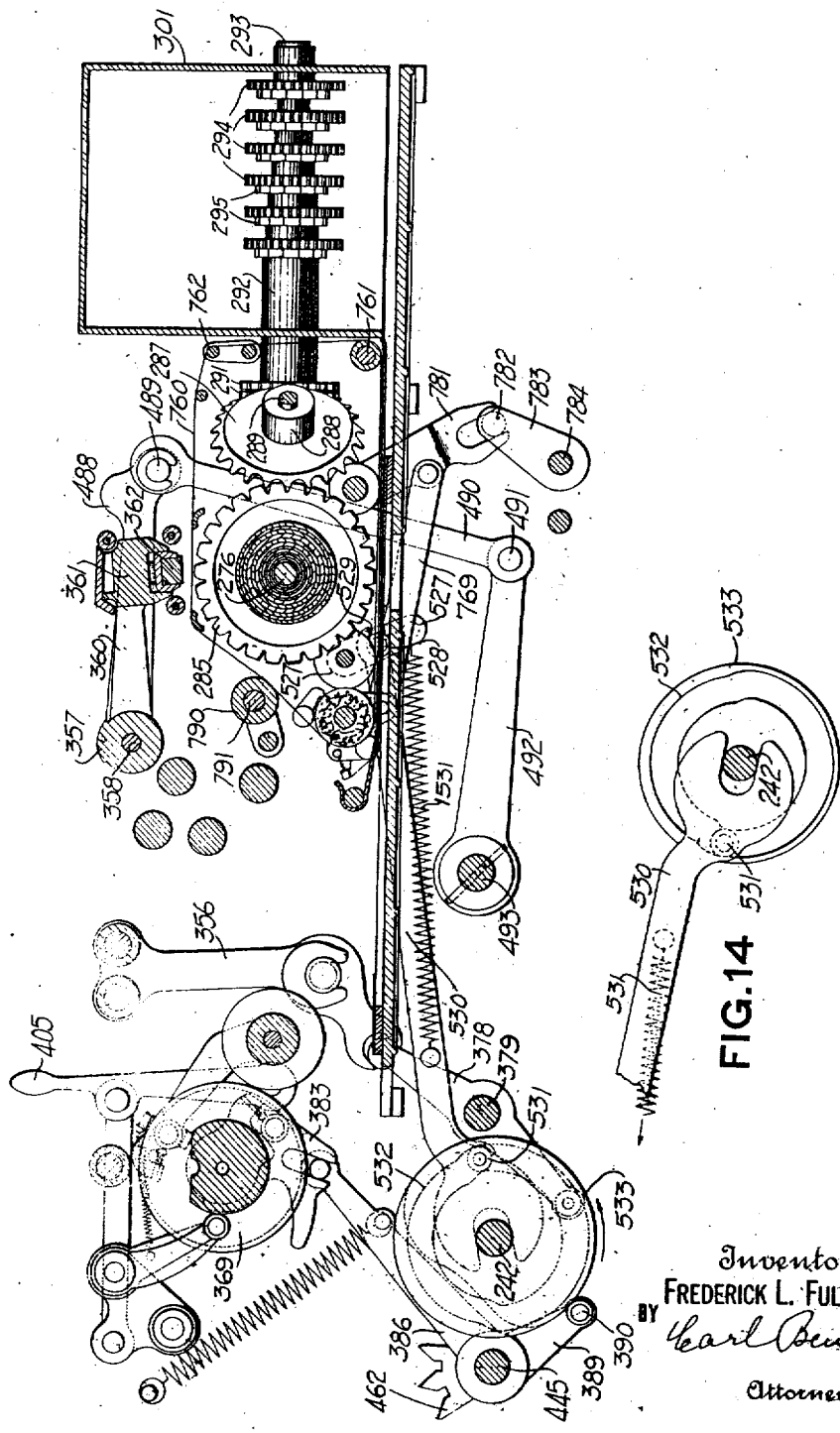

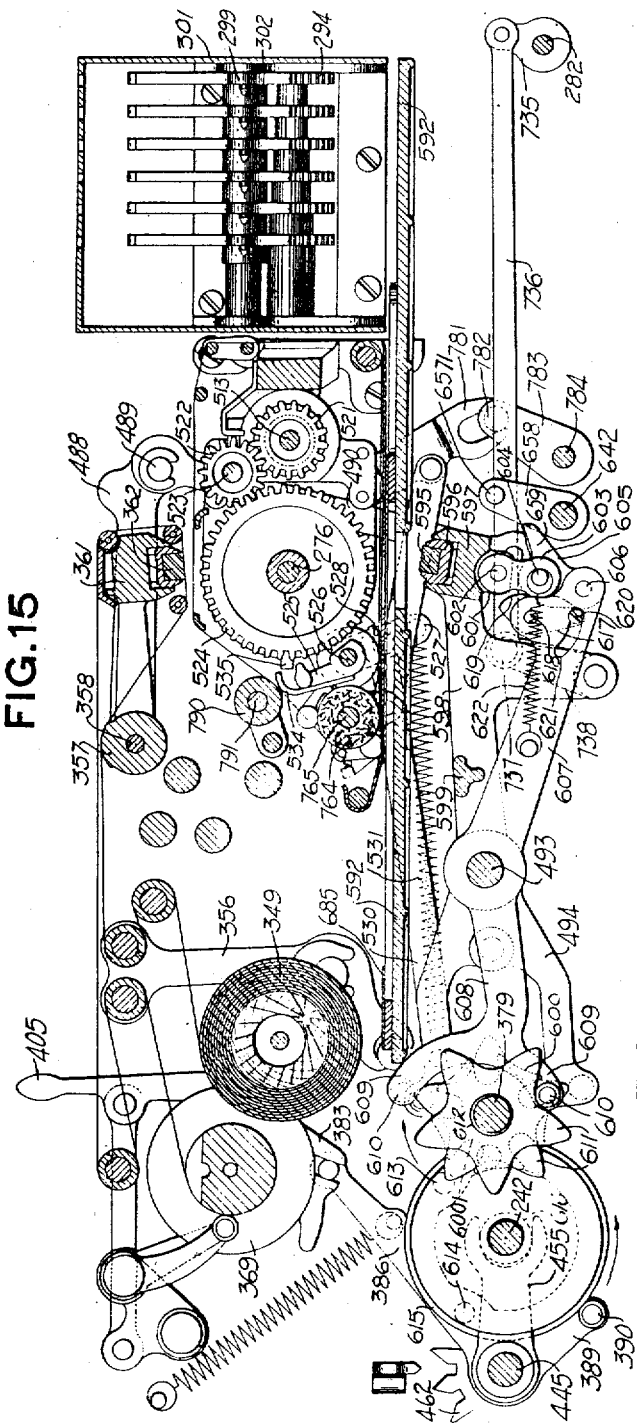

Aug. 12, 1924.

F. L. FULLER 1,504,226

CASH REGISTER

Filed May 7, 1918 13 Sheets-Sheet 10

Inventor
FREDERICK L. FULLER
BY *Carl Beust*
Attorney

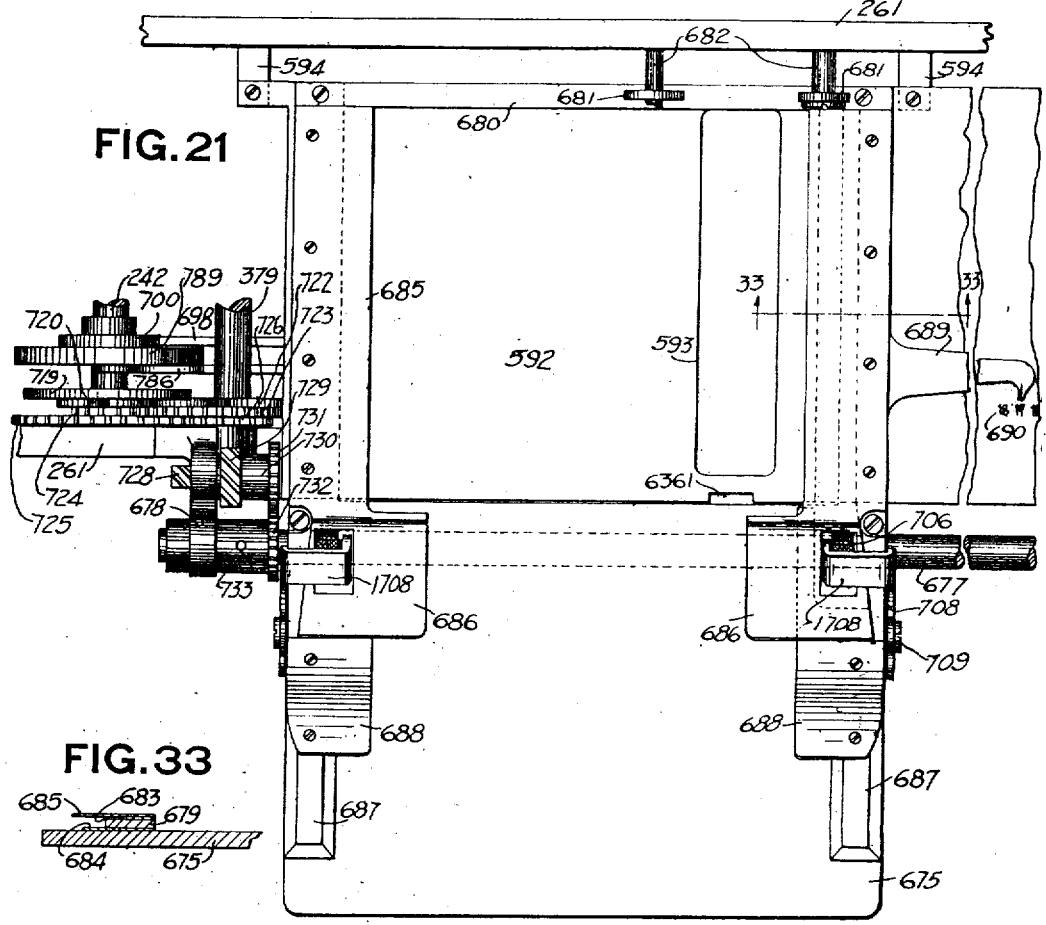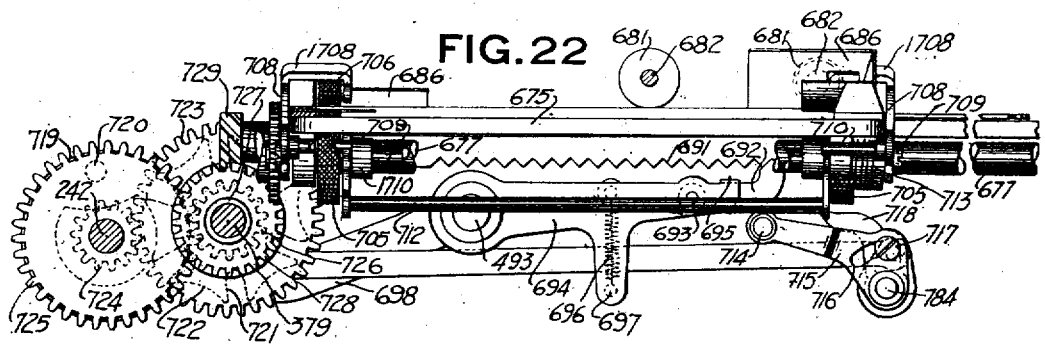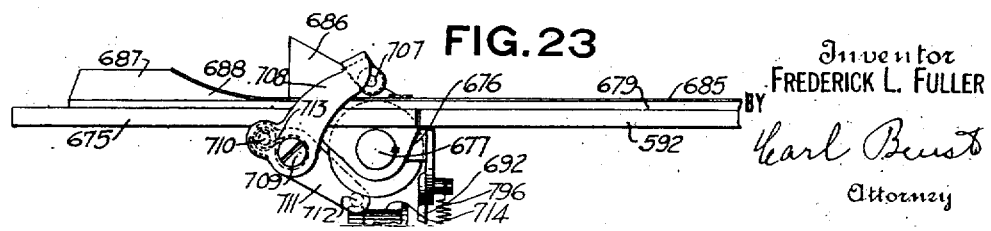

Aug. 12, 1924.

F. L. FULLER 1,504,226

CASH REGISTER

Filed May 7, 1918      13 Sheets-Sheet 12

Inventor
FREDERICK L. FULLER
BY Carl Beust
Attorney

Aug. 12, 1924.
F. L. FULLER
1,504,226
CASH REGISTER
Filed May 7, 1918 13 Sheets-Sheet 13
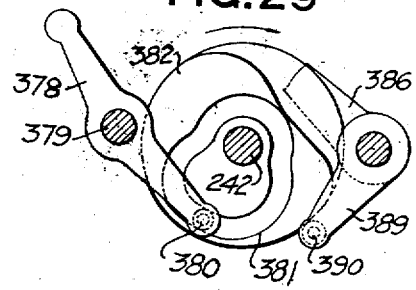
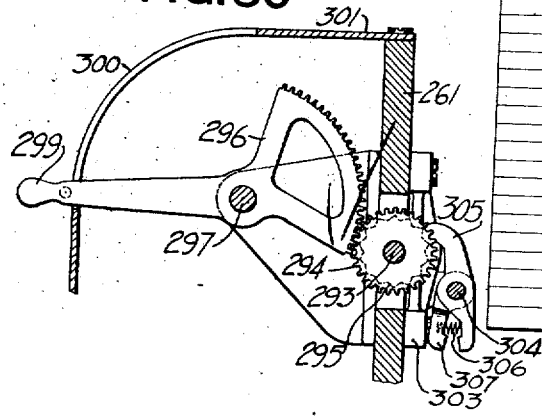
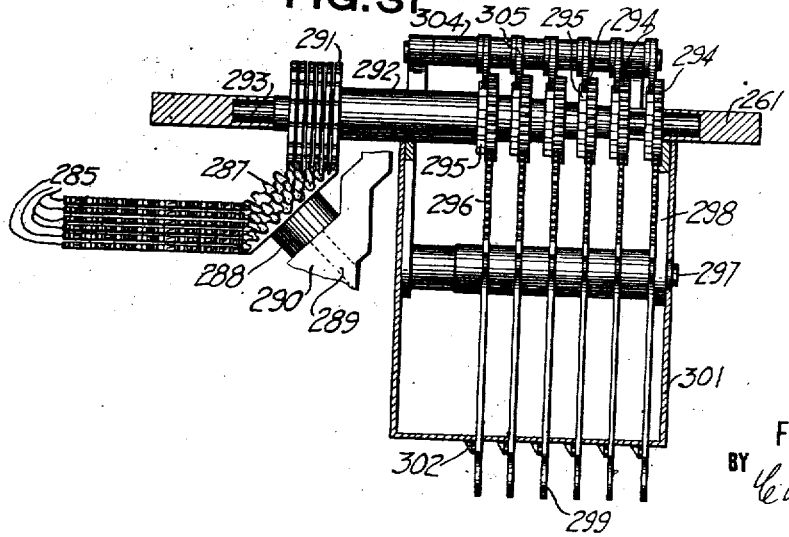
Inventor
FREDERICK L. FULLER
BY Carl Beust
Attorney Patented Aug. 12, 1924.

1,504,226

UNITED STATES PATENT OFFICE.

FREDERICK L. FULLER, OF BRIDGEPORT, CONNECTICUT, ASSIGNOR TO THE NATIONAL CASH REGISTER COMPANY, OF DAYTON, OHIO.

CASH REGISTER.

Application filed May 7, 1918. Serial No. 233,146.

*To all whom it may concern:*

Be it known that I, FREDERICK L. FULLER, a citizen of the United States, residing at Bridgeport, in the county of Fairfield and State of Connecticut, have invented certain new and useful Improvements in Cash Registers, of which I declare the following to be a full, clear, and exact description.

This invention relates to improvements in cash registers and the like and more particularly to the printing mechanism thereof.

The principal object of this invention is to provide an improved form of printing mechanism.

Another object of the present improvement is the provision of a machine adapted more particularly for use in savings banks and the like. The machine embodies a plurality of individual totalizers for segregating the totals of both deposited and withdrawal transactions handled by the different tellers; a plurality of individual totalizers for segregating the totals of different characters of negotiable papers or cash, making up a deposit; and an individual totalizer for segregating totals of interests, deposits and withdrawal transactions.

A still further object of the present improvements is to construct one of the keys in a key bank so that it will only release the machine and not control the differential mechanism and to position an individual totalizer at the zero position of another key bank so that when no key in this bank is operated and the release key is depressed, the amount set up on the amount banks will be accumulated upon the totalizer which is located at the zero position of the said key bank.

The present mechanism differs from that described in applicant's patent No. 1,311,884 granted Aug. 5, 1919, in that in the present machine a mechanism is provided for automatically computing and printing the new balance after a deposit or withdrawal transaction, whereas in the machine disclosed in said patent this new balance had to be computed mentally and written by hand on both the depositor's card and pass book. The automatic means just referred to comprises a subtraction totalizer of the type illustrated and described in a former patent of applicant No. 1,242,170 issued Oct. 9, 1917, and this subtraction totalizer comprises one of three totalizer lines with which the present mechanism is provided. The other two totalizer lines are of the type illustrated in applicant's patent No. 1,394,256, granted Oct. 18, 1921, and which are for the purpose of accumulating the totals of withdrawal and deposit transactions made by the various tellers and also segregating the totals of the amounts of the different negotiable papers, cash, interests, total deposits and total withdrawals.

It is also an object of this invention to provide a machine with a printing means so cooperating with the plurality of totalizers that impressions are made in different columns appropriate to the totalizers. In other words totals of deposits are printed in a certain column, totals of withdrawals are printed in another column and the new balance after a deposit or withdrawal transaction is printed in a separate column.

It is also an object of this invention to provide improved means for shifting the type carriers for the purpose of columnar printing instead of shifting the record material, the said means comprising connections between the differential segments and the said type carriers whereby they are simultaneously rotatably set and slid to their designated columnar position through the action of the differential segments controlled by the manipulative devices.

The invention also comprises a shiftable carriage for holding a card or deposit slip and a depositor's book and improved means for removing the card or slip after an item has been printed thereon, to permit the item to be printed on the book, the latter being under the card or slip at the beginning of the operation of the machine. The impression means is operated twice to carry the card or slip against the type carrier the first time and the book against the carrier the second time. The paper carriage is shiftable so as to adjust the printing mediums to receive an impression at any desired point.

Improved means is provided which is controlled automatically through the differential mechanism under the control of the manipulative devices for permitting the impression means to only make one impression when a paying check is in the machine irrespective of what position the manual control for the impression mechanism may occupy.

Improved means for preventing the contact of the impression means with the type carrier when no record material is present beneath the type carrier is also embodied in the present invention.

An improved mechanism is also provided for preventing the printing of the date upon the various printing mediums present upon the shiftable carriage when the machine is performing a total taking operation.

A still further object of the present improvement is to so control the printing elimination mechanism associated with a key bank by movement of the total lever, that during a total taking operation or re-set operation a character will be printed to indicate the total standing upon a totalizer which is located at the zero position of the said key bank.

With these and incidental objects in view, the invention consists in certain novel features of construction and combinations of parts, the essential elements of which are set forth in the appended claims, and a preferred form of embodiment of which is hereafter described with reference to the drawings which accompany and form a part of the specification.

Of said drawings,

Figure 1 is a diagrammatic illustration of the amount key banks and total lever and also shows diagrammatically the operation of the totalizer line selecting mechanism and its control by the keys in the teller's transaction, and balance key banks.

Figure 2 is a transverse sectional view of the machine taken alongside of one of the amount key banks, a part of the flexible detent and the inside key cover being broken away to show the key shanks.

Figure 3 is a vertical sectional view of the machine taken alongside of the teller's bank of keys, parts being removed to show clearly the connection between the differential mechanisms and the operating elements for the printing mechanism.

Figure 4 is a view in left hand elevation of the balance key bank which is also the release key bank for the machine, and shows the differential mechanism cooperating with this key bank, the inside key cover being removed to more clearly show the parts.

Figure 5 is a front elevation of the entire printing mechanism.

Figure 6 is a fragmentary detail view in right end elevation illustrating the manually operative means for controlling the impressions of the lower printing platen.

Figure 7 is a fragmentary detail view in top plan, partly in section, further illustrating the same mechanism which is shown in Fig. 6.

Figure 8 is a top plan view of the entire printing mechanism, the driving connection between the printer racks and the differential segments being broken away.

Figure 9 is a horizontal sectional view taken on the line 9—9 of Figure 10 and looking in the direction indicated by the arrows.

Figure 10 is a vertical sectional view taken on the line 10—10 of Figure 8 and looking in the direction indicated by the arrows.

Figure 11 is a view illustrating the cam and part of the arm for feeding the ink ribbon and also shows the cam and arm for actuating the aligner mechanism for the shifting paper carriage.

Figure 12 is a detail view illustrating the cam and a portion of the arm which cooperates with the feeler mechanism to cripple the lower impression platen for preventing an impression thereof.

Figure 13 is a vertical sectional view taken on the line 13—13 of Figure 8 and looking in the direction indicated by the arrows.

Figure 14 is a detail view of the cam and a portion of the arm for operating the aligner for the shifting type wheels.

Figure 15 is a vertical sectional view taken on the line 15—15 of Figure 8 and looking in the direction indicated by the arrows.

Figure 16 is a detail view of the cam Geneva plate and associated levers for operating the upper platen for taking an impression from the type wheels upon the detail strip.

Figure 17 is a detail view showing in end elevation and partly in section the shifting type wheels.

Figure 18:
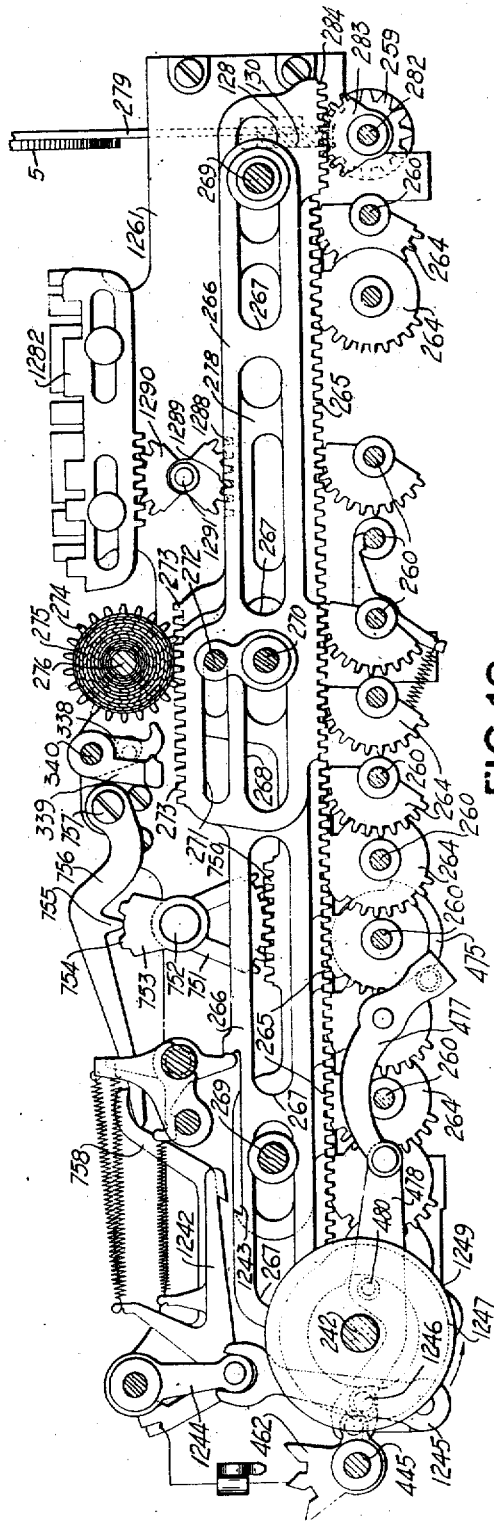

Figure 18 is a vertical sectional view taken on the line 18—18 of Figure 8 and looking in the direction indicated by the arrows, this view showing the racks for setting the type wheels and also illustrating the means actuated by the total lever for printing an indication during a total taking operation to show that the amount printed was a total standing upon the totalizer located at the zero position of the transaction key bank.

Figure 19:
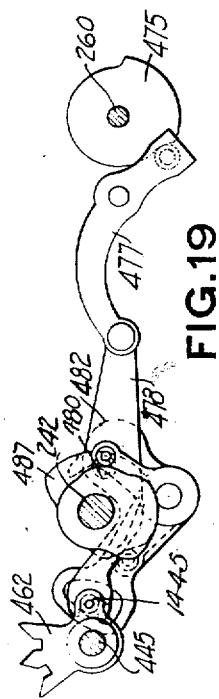

Figure 19 is a detail view of the operating mechanism for the automatic control of the impressions made by the lower printing platen.

Figure 20:
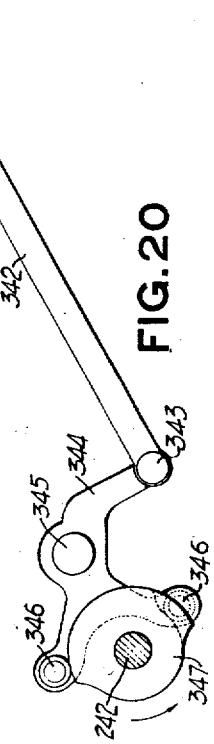

Figure 20 is a detail view illustrating the cam and associated levers for actuating the aligner for the gears which mesh with the printer racks.

Figure 21 is a detail view in top plan of the shiftable carriage for supporting the various printing mediums to receive impressions from the lower platen and also illustrates the ejecting mechanism for one of the said printing mediums.

Figure 22 is a front elevation partly in section of the mechanism illustrated in Figure 21.

Figure 23 is a righthand elevation of the mechanism illustrated in Figure 21.

Figure 24:
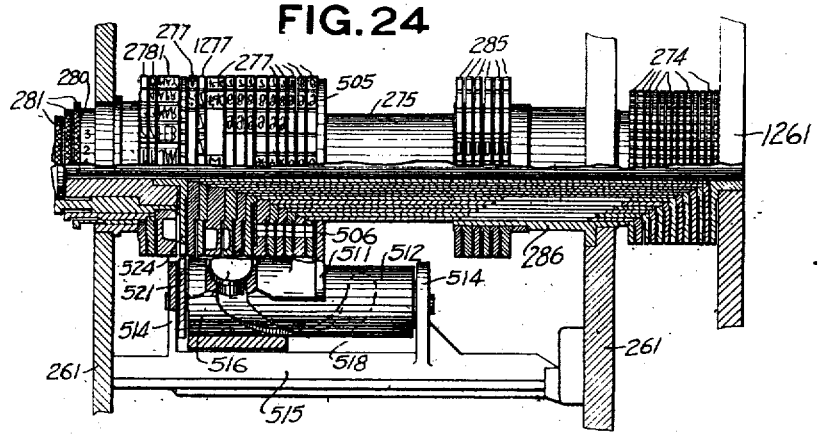

Figure 24 is a top plan view partly in section illustrating the type wheel line and also showing the mechanism for shifting a number of the type wheels thereof.

Figure 25:
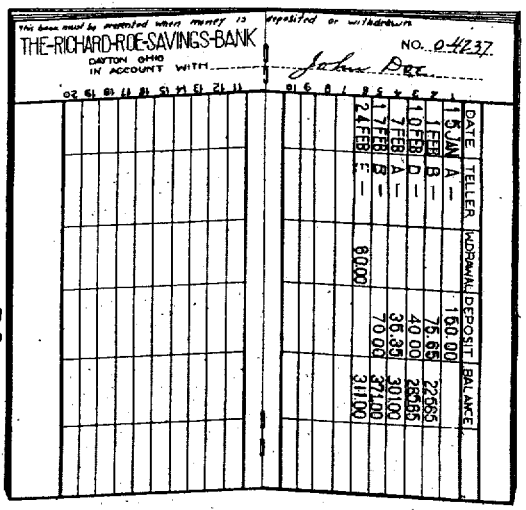

Figure 25 is a detail view showing the pass book which is used with the printing mechanism.

Figure 26:
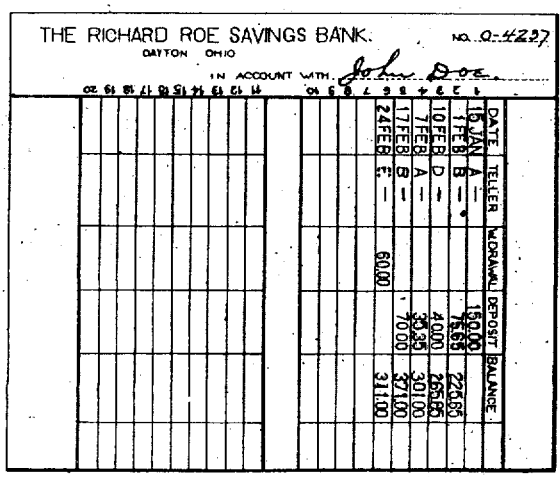

Figure 26 is a detail view illustrating a depositor's card which is used with the printing mechanism.

Figure 27 is a fragmentary detail view illustrating a portion of a detail strip printed by the printing mechanism.

Figure 28 is a detail view illustrating a deposit slip printed by the printing mechanism.

Figure 29 is a detail view illustrating the cam and associated levers for operating the feeding and spacing mechanism for the detail strip.

Figure 30 is a vertical sectional view through the manually operative means for setting the ledger type wheels.

Figure 31 is a top plan view partly in section illustrating the manually operative levers and their connection with the ledger type wheels for setting them.

Figure 32:
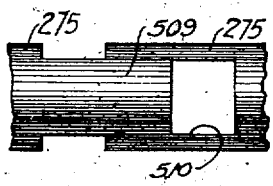

Figure 32 is a fragmentary view illustrating the connection between the sections of the divided sleeve that supports the shifting type wheels.

Figure 33 is a vertical sectional view taken on the line 33—33 of Figure 21 and looking in the direction indicated by the arrows.

The machine in the illustrative form of embodiment disclosed herein is designed, more especially for use in savings banks and the like, for insuring accuracy in and facilitating the recording of the amount deposited and amount withdrawn by depositors and computing the new balance of said depositors. The machine is more particularly adapted separately to totalize the amount deposited, totalize the amount withdrawn, to compute the new balance, and to print the depositor's number, the amount deposited or withdrawn by the depositor, the previous balance of the depositor and also the new balance of said depositor on a permanent record retained in the machine, and to print upon the depositor's pass book in the possession of the depositor and on the depositor's card such as is in the files in the savings bank the total amount of the deposit, the total amount of withdrawal, and the new balance standing to the depositor's account, the total amount of the deposit together with the new balance also being printed upon a deposit slip. Although the accompanying drawings show the invention in preferred form applied to this particular use it is to be understood that it is not intended to limit the invention to such use as it is equally well adapted for use in institutions similar to savings banks, such as postal savings systems, building associations, and ordinary banks, and also in many other mercantile establishments and in many other relations not only in the use of deposits and withdrawals of money but for stock, quantities and price, etc.

Described in general terms the machine comprises two totalizer lines mounted in frames which are movable to bring any one of the plurality of individual totalizers constituting each totalizer line into operative relation with differential actuators controlled by manipulative means, such as banks of keys. There is also a subtracting totalizer of the type illustrated in a former patent of applicant No. 1,242,170, which totalizer is also movable but only a predetermined distance in each direction for the purpose of either adding to or subtracting therefrom. The movement of the frame of the two totalizer lines which each comprise a plurality of individual totalizers is controlled by two banks of keys, the keys in one bank representing for instance, the different tellers in the savings bank, two keys in this bank being under the control of each teller and these two keys bearing the teller's initial, the keys however, being of different colors the one to be pressed by the teller when the transaction is a deposit and the other key to be pressed when the transaction is a withdrawal. These teller's keys serve to shift the totalizer line so that a totalizer appropriate to the key pressed will be actuated by the differential mechanism. The movements of the other frame which carries the totalizer line having a plurality of individual totalizers are controlled by another key bank representing various different transactions such as "foreign checks", "individual checks", "cash", "interest", "deposits", etc., these keys serving to shift the totalizer line so that the totalizer appropriate to the key depressed will be actuated by the differential mechanism. This key bank however, and also the totalizer line associated therewith are somewhat different from the teller's key bank and its associated totalizer line in that no totalizer is selected by the depression of either a key marked "old balance" or a key marked "new balance" these keys only controlling the printing mechanism to print a character indicating these two transactions. The totalizer line associated with this bank carries an individual totalizer which is selected for actuation by the zero position of the differential associated with the bank so that when no key in this bank is depressed the amount set up on the amount banks will be accumulated upon this individual totalizer of the totalizer line since at such a time the differential is in its zero position. The substraction totalizer is controlled by the keys in another key bank which is also the release bank for the machine. This bank contains keys marked "balance", "release key", "deposit", and "withdrawal". The "balance" key, "deposit" key, and "withdrawal" key, are release keys and are also designed to shift the subtracting totalizer into its additive and subtractive positions, the balance key and deposit key shifting the totalizer to its additive position while the last key mentioned shifts the said totalizer into its subtractive position. The release key in this bank merely releases the machine and does not lift the zero stop pawl so that as a consequence the differential mechanism does not move to shift the totalizer under the control of this key. The balance, deposit, and withdrawal keys also control a mechanism whereby the amount type wheels of the type wheel line are shifted so that they print in different columnar position, the amount being printed in the deposit column when the deposit key is pressed, the amount being printed in the withdrawal column when the withdrawal key is depressed and the amount being printed in the balance column when the balance key is depressed.

The present machine also includes a totalizer selecting mechanism of the same type as that illustrated and disclosed in applicant's Patent No. 1,394,256 before referred to, this totalizer selecting mechanism cooperating with the differentials whereby various totalizers and combinations of totalizers may be selected and positioned for operation so that the amount set up on the amount banks may be accumulated on any desired totalizer or accumulated on several desired totalizers simultaneously. As previously stated the machine has three totalizer lines two comprising a plurality of individual totalizers and the other a subtracting totalizer. Although these three totalizer lines might be so shifted through the depression of the keys that two individual totalizers were positioned for actuation and the subtractive totalizer set in its subtractive position, through the totalizer selecting mechanism just mentioned the controlling elements thereof may be so designed as to select but one of the individual totalizers for actuation although all three totalizer lines have been shifted. In other words, although various of the individual totalizers or the subtracting totalizer may be shifted for actuation, through the selecting mechanism just mentioned only those totalizer lines containing the selected totalizers are rocked into engagement with the differential mechanism so that they are actuated thereby to accumulate the amount set up upon the amount banks.

In the printing mechanism a single set of type wheels is provided, the wheels being of sufficient diameter to contain one series of type numerals or characters on the upper half of their peripheral edges, and a similar series on the lower half of their peripheral edges. Impression means is provided to take an impression from the upper set of type carried by the wheels onto a detail strip. Impression means is also provided for taking an impression from the lower series of type carried by the type wheels upon a deposit slip and a depositor's pass book or upon a depositor's ledger card and a depositor's pass book which are placed upon the shiftable paper carriage. This latter impression means is manually adjustable so that either a single or double impression may be taken, a double impression being desired when the deposit slip and pass book are present upon the shiftable paper carriage or when the depositor's ledger card and pass book are present upon said carriage, but only one impression is desired when the depositor's ledger card alone is present upon the said carriage.

In addition to the setting of type wheels commensurate with the amount set up on the amount banks, the setting of a character to print an indication of the special transaction and the printing of a character to indicate the teller making the transaction, manually adjustable means is provided for setting type wheels to indicate the depositor's account number or the like.

The impression means for printing on the detail strip is operated at each operation of the machine. The impression means for the deposit slip, pass book, and ledger card, however, is automatically disabled when neither a deposit slip, pass book, or ledger card is upon the shiftable paper carriage, this being the case when the machine is operated to print a total or subtotal only on the detail strip.

The shiftable paper carriage heretofore mentioned is movable for the purpose of spacing the impressions made by the printing mechanism upon the depositor's pass book and also the depositor's ledger card. Index numbers are provided which cooperate with a pointer attached to the shiftable paper carriage so that the said carriage may be positioned to print an impression upon any desired portion of the pass book or ledger card. Means is also provided for locking the shiftable paper carriage in its set position during the operation of the machine so that said carriage may not be moved out of alignment while the impression mechanism is being actuated.

As previously stated no key is depressed to position the total withdrawal totalizer for actuation by the differential mechanism so that during a total taking operation when it is desired to take the total withdrawal from the withdrawal totalizer means is provided for printing an indication that the amount is a total of the withdrawal transaction. This printing mechanism is set by the total lever which cooperates with the printing elimination mechanism associated with the transaction key bank so that when the total lever is moved one step to either its total or re-set position the type carrier associated with the transaction bank will not be moved to its non-print position but will occupy a zero position at which point the said type carrier is provided with a character "W" to print an indication of the total withdrawal instead of a dash.

The machine is also provided with mechanism to print the totals of amounts accumulated on the various totalizers as shown and described in patent to W. A. Chryst No. 1,230,864 and applicant's Patent No. 1,242,170 and in addition is provided with novel means connected with the totalizing lever so that upon adjusting the lever to set up in the machine a condition to "take total" or "read" the totals of the various counters, a type wheel will be set to print a character to show that the amount printed was impressed either during a "total taking" or "reading" operation of the machine.

The functions and construction of the machine itself will be hereinafter described in detail with reference to the accompanying drawings, the manipulation of the machine when used in a savings bank being as follows. The customer presents his book and deposit slip, together with the items of deposit which may consist of foreign checks, individual checks, clearance house checks, and cash. The teller first sets up the customer's account number with the ledger device and the amount of the customer's old balance upon the amount key bank. He then depresses the old balance key and the balance key whereby the transaction is printed upon the detail strip and the amount of the old balance added upon the balance totalizer. The teller then inserts the customer's pass book and deposit slip within the printer and presses the amount keys corresponding to the total amount of the deposit, his teller's receiving key and the deposit key in both the transaction and balance key banks. The machine will then print the total amount of deposit in the deposit column of the pass book and on the detail strip and the amount of the deposit will be added upon the teller's receiving totalizer, on the total deposit counter, and on the counter containing the old balance thus creating a new balance. During the operation just described the deposit slip was ejected from the machine after it was printed upon and previous to the making of an impression upon the pass book. The deposit slip is again placed back in the printer by the teller and the re-setting lever is drawn to the balance position and the new balance key and balance key are depressed. The new balance will then be printed in the balance column of the pass book, and also upon the deposit slip. At the same time the balance totalizer is cleared and the re-set lever is then thrown back to the adding position. After the pass book has been removed from the printer the teller then registers the amount of cash in the deposit by depressing the amount key, the cash key, and the release key. The amount will only be accumulated on the cash totalizer in this operation and the total standing thereon will give to the teller the total amount of cash taken during the day and thus provide him with a check on his cash balance. The preceding description covers the operation of the machine in connection with deposits.

In handling withdrawals the customer presents his pass book at the window of the card clerk with the statement as to the amount he desires to withdraw. The card clerk has a machine identical with the teller's machine which is described herein. The card clerk takes from the card file the customer's ledger card and then manipulates the register as follows. He first sets up the customer's account number with the ledger device and the amount of the customer's old balance upon the amount banks and operates the machine in the same manner as when a deposit is handled by the receiving teller. He then places the customer's pass book and the ledger card in the printer, presses the amount keys to the amount of the withdrawal, his paying initial key and also the withdrawal key. The operation of the machine prints the amount of withdrawal in the withdrawal column of the pass book and in the withdrawal column of the ledger card and creates a new balance on the balance totalizer. At the same time the amount is added on the teller's withdrawal totalizer and also on the total withdrawal totalizer. During the operation just described the ledger card was ejected from the machine to permit an impression to be made on the pass book and after this impression is made the card is placed back into the printer by the clerk and the total lever thrown to the re-set position. The new balance key and balance key are then depressed and when the machine is operated the new balance will be printed in the balance column on both the ledger card and the pass book and the balance totalizer is left clear. The clerk may then either give the customer the amount of his withdrawal in cash or may if the customer desires or should the system of the bank so require give to the customer a check to the amount of his withdrawal which the customer signs and presents at the teller's window for payment. The teller then places this check in his machine, depressing the amount keys to the amount of the withdrawal, his teller's paying key and the release key. The operation of the machine prints the amount of the withdrawal on the check and adds the amount on the teller's paying totalizer and also on the grand total withdrawal totalizer. When this system is used, that is, where the card clerk presents the customer with a check for the amount of the withdrawal and the combined paying and receiving teller cashes the check, the total withdrawal totalizer in the teller's machine and the withdrawal totalizer in the card clerk's register should balance and provide a check one against the other.

For the purpose of illustration, the invention is shown applied to a type of machine the general principle of which is disclosed in the two patents heretofore mentioned. While the invention is shown applied to this particular type of machine, it is to be understood that the invention is susceptible of use with other types of accounting machines, and therefore, it is not intended to limit the scope of the invention for use with the particular type of machine shown. The present improvement resides to a great extent in the printing mechanism and while this printing mechanism is shown applied to the particular type of registering mechanism exemplified by the above noted patents, however, it is to be understood that this printing mechanism is susceptible of use with various other types of accounting machines, and therefore, it is not intended to limit the scope of this invention for use with the particular type of machine shown.

Operating mechanism.

The operating mechanism which it is desired to use with the present invention is of the well known type shown and described in Letters Patent of the United States No. 1,242,170 granted to the present applicant October 9, 1917 in which both an electric motor and hand operated drive is disclosed. The electric motor, its connection and control, and the specific construction of the hand operated drive are not illustrated herein and for a disclosure thereof reference is made to the patent just mentioned.

Keyboard.

The keyboard (Fig. 1) comprises six banks of amount keys 1, one bank of teller's keys, 2, one bank of transaction keys, 3, one bank of balance keys, 4, and a total control lever 5, employed to control the machine for total and sub-total printing operations. The construction of the key banks is very similar to that shown and described in the aforesaid Fuller Patent No. 1,242,170, and, therefore, they will be described but briefly here. The keys of each bank are mounted in an individual frame 11 (Figs. 2, 3 and 4) mounted on cross rods 12, and springs (not shown) of the usual construction are employed normally to retain the keys in undepressed position.

The amount keys 1 (Fig. 2) cooperate with key detents 14 and locking plates 15. The detents 14 are supported at their upper and lower ends by arms 16 and 17 respectively loosely pivoted on pins 18 carried by the key frame 11. When a key is depressed the inclined edge of a shoulder 19 on the key engages a corresponding pin 20 on the detent, thus moving the latter downwardly until the shoulder is past the pin, when the detent is raised slightly thereby retaining the key in depressed position. The arm 17 engages a pin 21 on a zero stop pawl 22 which is normally in effective position and when the detent 14 is moved downward, the pawl 22 is rocked clockwise (as viewed in Fig. 2) to render it ineffective. A spring 23 connected at its lower end to the pawl 22 and at its upper end to the key frame serves to retain the pawl 22 and detent 14 in normal position.

The locking plates 15 for the banks of amount keys are provided with extensions which immediately upon the depression of any of the keys in the balance key bank 4 to release the machine pass over pins 24 on the depressed keys and under the pins 24 on the undepressed keys, thereby preventing manipulation of the keys during an operation of the machine. In order to give the locking plates 15 the required upward movement, the upper supporting arms 25 for the locking plates are provided with extensions 26 extending over a rod 27 carried by arms 28 fast on a shaft 29. This shaft 29 is rocked counter-clockwise (as viewed in Fig. 2) upon depression of any of the keys in the balance key banks 4, as will be hereinafter described, whereupon the rod 27 lifts the locking plates into locking position.

The construction of the key banks 2 and 3 (Fig. 1) which contain the teller's keys and transaction keys respectively is identical, the bank 2 being taken as representative of the two banks and shown in Figure 3. A key detent 30 and locking plate 31 are provided to perform substantially the same function as the detents and locking plates for the amount banks. The detent 30 is pivoted at one end to an arm 32 pivoted to a stud 33 carried by the key frame and engaging a pin 34 carried by a zero stop pawl 35. The upper end of the detent is pivoted to a stud 36 carried by an arm 37 pivoted to a stud 38 carried by the key frame. When a key in the bank is depressed, the detent 30 is moved downwardly and means, hereafter to be described, holds the key in depressed position and also rocks the zero stop pawl 35 clockwise to render it ineffective.

The latch plate 31 is pivoted at its lower end to an arm (not shown) loose upon the stud 33 and at its upper end to a stud 39 carried by the lower end of an arm 40 pivoted at its upper end to the stud 38. The arm 40 is provided with a projecting nose 41. The depression of one of the keys 2 engages a pin 42 carried thereby with an inclined slot 43 formed in the latch plate 31, which causes the said latch plate to be cammed downwardly. The downward movement of the latch plate positions the portions between the slots beneath the pins 42 on the keys which are not depressed and prevents their manipulation during an operation of the machine. Means is provided for holding the plate 31 in its downward position during the operation of the machine and this means comprises the same elements which are fully shown and described in applicant's patent No. 1,394,256 herein before referred to, and which elements are operated through the actuation of the release mechanism for the machine as is also fully described in said patent. At the proper time during the latter part of the operation of the machine the elements which held the plate 31 in its downward position are removed to permit the latch plate to return to its normal position and at the same time release the depressed key.

The bank of keys illustrated in Figure 4 and which will hereinafter be termed the "balance key bank" has a construction very similar to the key bank illustrated in Figure 3 and which has just been described. The keys of this bank which are numbered 6, 7, 8, and 9 bear inscriptions reading "balance," "release key," "deposit" and "withdrawal" respectively. They are mounted within the usual type of key frame 11 supported by the rods 12 and carry on their key shanks pins 44 which cooperate with inclined notches 45 in a detent 46 which is pivoted at its upper end to an arm 48 pivotally mounted upon a stud 49 carried by the key frame. The lower end of the detent 46 is pivoted to an arm (not shown) loosely mounted upon a stud 33 which is similar to a stud bearing the same number illustrated in Figure 3. The outer end of the arm 48 carrys a pin 50 which cooperates with the elements that release the machine, the actuation of these elements also rocking the shaft 29 and thereby locking the detents 15 and 31 of the key banks previously described. From this it will be understood that when any of the keys in the balance key bank are depressed the machine is released and at the same time all of the keys which have been depressed are held in their depressed positions and all those which have not been depressed are locked in their raised positions and thereby held against manipulation during the operation of the machine. The keys 6, 8 and 9 of the balance key bank have shoulders 19 which cooperate with pins 20 carried by the detent 14. This detent 14 like the one illustrated in Figure 2 is pivoted at its upper end to a link 47 carried by the stud 49 and at its lower end to an arm 47 loose upon the stud 33, the arm engaging a pin 21 on a zero stop pawl 22 which is normally in effective position and when the detent 14 is moved downward by the depression of any one of the keys 6, 8 or 9, the pawl 22 is rocked clockwise (Fig. 4) to render it ineffective. A spring 23 connected at its lower end to the pawl 22 and at its upper end to the key frame serves to retain the pawl 22 and detent 14 in normal position. Attention is called to the fact that no pin 20 is provided on the detent 14 to cooperate with the shoulder on the shank of the key 7 so that as a consequence when the key 7 is depressed it will release the machine through the actuation of the detent 46 but will not move the detent 14 and consequently not render the zero stop pawl 22 ineffective but will permit it to remain in its effective position. The purpose of this construction will be hereinafter described in detail.

The total lever 5 is identical with the total lever which is fully shown and described in applicant's former Patent No. 1,394,256 and as a consequence it will not be either specifically illustrated or described herein. The finger piece or handle of the lever is movable in a longitudinal slot 90 (Fig. 1) to adjust it to the desired position. If the lever is moved one step above its central or adding position it will control the machine for printing a sub-total and when moved one step below its adding position it will control the machine for printing a total. Locks (not shown) and of the usual type are provided to prevent unauthorized persons from operating the total lever. When the locks are operated by keys inserted in the key barrels to lock the total lever in adding position the bolt of one of the locks is above and the bolt of the other lock below the handle of the lever.

When the total lever is moved to prepare the machine to print totals or sub-totals of the teller's totalizers, the amount keys, transaction keys, and the balance bank keys except the release key, are locked out. A shaft 92 (Fig. 2) carrying arms 93 which support a rod 94 extends across the ends of the arms 17 which support the lower ends of the detents 14 of the amount banks. As the total lever is moved into a teller's total position the rod 94 is rocked into position to prevent counter-clockwise movement of said arms and therefore depression of the amount keys.

Depression of the balance bank keys and transaction keys is prevented by an interlocking mechanism 1282 (Fig. 18) also controlled by said lever. When a transaction total is desired, the transaction keys are free and the teller's, amount and balance bank keys are locked out. The rod 94 is given a further movement as the drivers for the differential actuators are moved up a second time during total printing operations. This movement releases the zero stop pawls, thereby permitting the actuators to be controlled by the selected totalizer. All this mechanism is old and for a more detailed description reference may be had to Patent No. 1,394,256 before referred to.

The differential mechanism.

To drive the differential mechanism of the machine the drive shaft 100 is provided with a plurality of pairs of cams 101 and 102 (Figs. 2 and 3) each pair cooperating with rollers 103 and 104 respectively carried by Y-shaped levers 105 of which there is one for each bank of amount keys in the machine. Each of these levers 105 is pivoted at 106 on a corresponding frame 107 as is fully shown and described in the aforesaid Fuller Patent No. 1,242,170. Loosely mounted on studs 108 carried by the frames 107 which support the differential units adjacent the banks of amount keys are differentially movable members 109 carrying racks 110 and transfer arms 111 for operating the totalizer pinions 112 (Fig. 2). The levers 105 at the upper end of their upwardly extending arms are pivotally connected by links 113 to driving segments 114 loose on the studs 108. The driving segments 114 are connected to the differentially movable members 109 by latches 115 each of which is supported by an arm 116 and a lever 117 pivoted on the corresponding differentially movable member. Springs 118 hold the rear ends of the latches 115 in engagement with shoulders on the driving segments. When the segments 114 are driven by their cams 101 and 102, the differentially movable members 109 are carried with their latches up to points where the forwardly extending arms of the levers 117 engage the depressed keys. Such engagement results in disengagement of the latches from the driving segments 114 and engagement of the forward ends of the latches with the particular notches 119 of plates 120 opposite the latches at the time. Upon return movement, the driving segments engage studs 1110 on the differentially movable members and return the latter to normal position. If a key is not depressed in an amount bank a zero stop pawl 22 for that particular bank operates the latch to arrest the differentially movable number in zero position. When a key is depressed, however, the arm 17 through its engagement with the pin 21 on the zero stop pawl 22 moves the latter out of operative position.

The differential mechanisms which cooperate with the tellers, transaction and balance key banks are identical with those which have just been described, except that the plates 109 are omitted and arms 1109 (Figs. 3 and 4) are substituted therefor. Since all of this structure is fully described in the aforesaid Fuller Patent No. 1,242,170 no detail description of the arms 1109 or their functions will be given herein other than to say that the studs 1110 carried thereby provide the means whereby the driving segments 114 swing the arms and latches 117 clockwise during the operation of the machine.

Totalizers and totalizer selecting mechanism.

Heretofore totalizer selecting mechanisms used with machines of the Chryst type were of one kind as is illustrated in the before mentioned Fuller patent which may be taken as an example. In these prior machines where a plurality of totalizer lines were provided each line containing a plurality of individual totalizers, the particular totalizer was selected by sliding the totalizer line but all the totalizer lines were rocked into engagement with the differential mechanism at every operation of the machine. As a consequence should it be desired to accumulate on but one totalizer, where a machine had two totalizer lines, the only way the desired result could be accomplished was by removing the totalizer wheels from the totalizer line which it was not desired to operate. This construction manifestly led to a very limited number of totalizer selection combinations.

In the present machine three totalizer lines are provided and the mechanism for shifting these totalizer lines to select various totalizers in the teller's and transaction totalizer lines and to position the balance totalizer in either its additive or subtractive position is also provided similar to that mentioned above. In addition, however, a totalizer line selecting mechanism is provided with means for preventing or permitting as desired one, two or three of the totalizer lines to be rocked into engagement with the differential mechanism simultaneously. Due to this construction totalizer controlling keys may be pressed either singly or in combinations, but only one totalizer selected thereby to accumulate the amount, due to the totalizer line selecting mechanism. As an additional result a plurality of totalizer selecting keys may be depressed and their particular teller or transaction printed while the amount will be accumulated on but one of the totalizers if such result is desired. Then again two totalizer keys may be depressed and the amount accumulated on one, two or three totalizers, this result being attained as before described by the totalizer selecting mechanism which automatically determines which or how many of the totalizer lines are to be rocked into engagement with the differential mechanism.

Each totalizer of the individual totalizers which comprise the transaction and teller's totalizer lines consists of one pinion in each group of pinions, and therefore if the first pinion of each group is engaged with the differential actuators 110 a certain individual totalizer will be operated; if the second pinion of each group is engaged with the actuators a different totalizer will be operated, etc. This arrangement of multiple totalizers is fully described in a United States Patent No. 1,109,763, granted September 8, 1914, to Chas. F. Kettering.

The totalizer line selecting mechanism which is the means for automatically causing one or more of the totalizer lines each containing a plurality of totalizers to be rocked into mesh with the differential actuators and also to control the meshing of the subtracting totalizer with the differential actuators is of exactly the same type as that fully illustrated and described in the aforementioned Patent No. 1,394,256. As a consequence this mechanism will not be described herein specifically but merely a diagrammatic illustration presented to demonstrate the control of the totalizer line selecting plates with which the machine is provided. The present machine is only provided with two totalizer line selecting plates which are associated with the transaction and balance key banks respectively and are set by the actuation of the differential mechanism associated with these banks in a manner similar to that described in the said patent.

The arrow lines at the right hand portion of Fig. 1 together with the short arrows connecting the longer arrow line with the keys, indicate diagrammatically the manner in which the totalizer lines controlled by the keys rock into mesh with the differential actuators.

First taking a deposit transaction and referring to this diagrammatic illustration, when the "old balance key" in the transaction key bank and the "balance key" in the balance key bank are depressed, which is the first operation in the deposit transaction, it will be seen that an arrow line is connected to the "old balance" key the arrow head thereof pointing to the balance key bank and an arrow line is connected with the "balance key" which terminates in said head pointing to the balance key band. This indicates that a depression of these two keys will set the two totalizer line control plates which are associated therewith in a position to cause an engagement of only the balance totalizer line with the differential actuator during the operation of the machine, it being remembered that a depression of the "balance" key also shifted the balance totalizer into its additive position. As a result the amount of the old balance will be accumulated on the balance totalizer only. Referring to the transaction key bank it will be seen that an arrow line is connected with the "deposit" key by a short arrow line, connected to a longer arrow line having three heads pointing to the teller's, transaction, and balance bank of keys. This indicates that a depression of the "deposit" key in the transaction bank so sets the plate associated therewith that all three totalizer lines will be rocked into mesh. It will be remembered that after the old balance has been accumulated on the balance totalizer, the teller's receiving key which is a white key, the "deposit" key in the transaction key bank and the "deposit" key in the balance bank are depressed. As previously stated a depression of the "deposit" key in the transaction key bank will determine and cause an engagement of all three totalizer lines for actuation so that as a consequence the amount of the deposit set up on the amount banks will be accumulated on the teller's individual receiving totalizer, the deposit individual totalizer, and the amount added to the balance totalizer which is still held in its additive position by depression of the "deposit" key in the balance bank whereby a new balance is carried on the balance totalizer. In order to compute the new balance and print the same, as will be hereinafter described in detail, the total lever 5 is moved to its balance re-set position. This movement of the total lever cripples the function of the totalizer line selecting plate and the lever itself selects the balance totalizer for engagement with the differential actuators in the same manner as is fully shown and described in Patent No. 1,394,256. During a withdrawal operation the old balance is first accumulated on the balance totalizer in the same manner as was described in connection with a deposit operation. The teller's paying key and the "withdrawal" key in the balance bank are then depressed. The "withdrawal" key is connected by an arrow which has two arrow heads that point to the balance key bank and the transaction counter. Therefore a depression of the "withdrawal" key will position its associated totalizer line selecting plate so that both the balance counter and transaction totalizer line will be rocked into mesh with the differential actuators. It will be remembered that a depression of the withdrawal key positioned the balance totalizer in its subtractive position whereby the amount of the withdrawal will be subtracted from the old balance and a new balance created. Since no key was depressed in the transaction key bank the differential will remain in its zero position thereby its associated totalizer line selecting plate will be set to accumulate the amount of the withdrawal on the total withdrawal totalizer which is located at the zero position of the transaction bank and also to accumulate the amount of the withdrawal on the teller's paying totalizer since the teller's paying key is depressed during the accumulation of the withdrawal. This action of the totalizer line selecting plate associated with the transaction bank is indicated by the arrow connected to "total withdrawal" position which has arrow heads pointing to the teller's and transaction key banks. In order to compute the new balance the total lever is moved to the same position as when a new balance after a deposit transaction was computed and the operation of the machine when computing and printing the new balance after the withdrawal operation is the same as previously described.

The printing mechanism.

The entire printing mechanism is driven by the operation of the cash register. During adding or listing operations of the register it is desired that the printer should operate every time that the register is actuated for adding operations. During total or re-set operations, however, the registering mechanism receives two rotations in order to complete said total or re-set operations and in such a case it is desired that the printer should operate only once, this operation occurring during the second rotation of the register so that the total of the selected totalizer will be printed. In order to accomplish this result mechanism is provided, controlled by the total lever, so that when the said total lever is set for total or re-set operations the printer will not be driven during the first rotation of the register but will be only driven during the second rotation thereof. This mechanism is not illustrated herein nor will it be specifically described for the reason that the same mechanism is employed herein as is fully shown and described in Patent No. 1,394,256. It is sufficient here to state that all of the printer mechanism except the mechanism for setting the type wheels is driven from a shaft 242 (Figs. 8, 9, 10, 13, and 15) so that this shaft may be termed the printer drive line. The type wheels themselves are set through the action of the differential mechanism under the control of the manipulative devices by means which now will be described. To each of the differential members 109 is pivoted the usual beam 125 the rear end of which is bifurcated to receive a pin 126 carried upon a link 127. The lower end of each link 127 is pivoted to an arm 128 connected by a pin 129 with a segment 130 loose upon a rod 131, the upper end of the said link 127 being pivoted to an arm 132 secured to a sleeve 133 surrounding a shaft 134. The shaft 134 supports the nested sleeves 133 which are for the purpose of actuating indicators when the machine is so equipped, the machine herein however not being provided with any indicators, since no visual indication of the operation of the machine is desired other than that which is printed upon the detail strip and the depositor's deposit slip, pass book, and ledger card.

Meshing with each of the segments 130 which are actuated by the movement of the differential mechanism, referring now to Figs. 2, 3, and 4 is a spiral gear 259 secured to a shaft 260 having bearing within a frame 261 and a bar 1262 carried by a frame 1261 both of which extend across the front of the register. Retaining collars 262 and 263 (Fig. 9), the former attached to the gears 259 and the latter secured to the shafts 260 on the opposite side of the bar 1262, hold the shafts 260 in their proper position. Secured to each of the shafts 260 and within the frames 261 and 1261 is a toothed segment 264, referring to Fig. 18. There is one spiral gear 259 associated with each of the amount, teller's, transaction and balance key banks and one with the total lever 5, and consequently with each of these key banks and total lever there is also associated a toothed segment 264, meshing with which are teeth 265 made on the lower edge of horizontally positioned racks 266 which are slotted at 267 and 268 to receive rods 269 and 270 which support them. Above the slot 268 each rack is provided with another slot 271 which receives a supporting rod 272. Above the slot 271 each of the racks is provided with teeth 273 which mesh with the teeth of gears 274 which are fast upon nested sleeves 275 and a shaft 276, the other end of the said sleeves 275 and shaft 276 carrying type wheels 277 as is illustrated in Figs. 8, 10, 13, and 24. By the mechanism herein described, when the segments 130 are actuated commensurate with the positioning of the differential segments the spiral gears 259 are driven, which through the toothed segments 264 meshing with the teeth 265 of the racks 266 drive the said racks a distance sufficient, through the medium of the teeth 273 thereon and the gears 274 to set the type wheels associated with the racks to correspond with the actuation of the differential segments - determinable by the keys depressed. In other words, each differential segment is provided with a rack 266 which is driven commensurate with the movement of the differentials so that for each bank of keys a type wheel is set to print a character corresponding with a key depressed in a key bank.

In the printing mechanism a single set of type wheels 277 is provided, the wheels being of sufficient diameter to contain one series of type numerals or characters on the upper half of their peripheral edges and a similar series on the lower half of their peripheral edges. The type wheels are so formed for the reason that an impression mechanism, hereafter to be described, cooperates with the upper set of type carried by the wheels and a second impression mechanism hereafter to be described, cooperates with the lower set of type carried by the said wheels.

As is usual in the art, there are provided totalizer wheels for which no banks of amount keys are employed, these elements being of highest denomination and operated in adding operations only when transfers to them are necessary. Differential units like those controlled by the amount keys are provided to actuate these totalizer elements of highest denomination, and through the corresponding connection above described, position type carriers of highest denomination during total and sub-total printing operations of the machine.

All of the racks 266 which are associated with the amount key banks, teller's bank, transaction bank, and balance bank are the same as far as the setting of the type wheels is concerned. There is also, however, one rack 278 (Fig. 18) which is set by the movement of the total lever so that a type will be positioned to print a letter to indicate whether the amount printed is a total or sub-total. The driving connection between the total lever 5 and the rack 278 comprises a link 279 which is pivoted to the total lever 5 and to an arm 128 loose upon the rod 131, a spiral gear segment 130 being secured to the arm 128, all of which elements are similar to the ones operating with the beams that are controlled by the differential segments. The spiral gear segment 130 meshes with a spiral pinion 259 which is fast upon one end of a shaft 282 rotatably mounted within the framework 261 and bar 1262, carrying on its other end a toothed segment 283 which meshes with teeth 284 in the lower edge of the rack bar 278. This rack bar like the bars 266 is also provided with teeth 273 on its upper edge which mesh with a gear wheel 274 which is fast upon one end of one of the nested sleeves 275, the other end of the sleeve carrying a type wheel 1277 (Fig. 24). The rack bar 278 also has teeth 1288 on its upper edge which mesh with the lower teeth 1289 of a double toothed segment 1290 rotatably mounted on a shaft 1291 secured within the frameworks 261 and 1261, the upper teeth of the segment meshing with an interlocking mechanism 1282 of the usual type which is set by actuation of the total lever. The type wheel 1277 bears type having letters "X" and "Z" which are positioned commensurate with the setting of the total lever through the link 279, and gears just described. When the total lever is moved to a sub-total position a letter "X" on the type wheel is set in printing position and when the total lever is moved to a total position a letter "Z" is moved into printing position. When the total lever 5 is moved into adding position no letter is ever printed, there being no letter on the type wheel 1277 when it is set in printing position by the total lever 5 being moved into adding position.

It will be seen by referring to Fig. 24 that there are eleven type wheels 277, the first nine reading from the right end being controlled by and adapted to print totals and sub-totals commensurate with the setting of the totalizer wheels or keys depressed in the amount banks. The next wheel 277 reading to the left is set by the differential controlled by the transaction bank and the last type wheel 277 which is separated from the one just mentioned by the type wheel 1277 is set by the differential controlled by the teller's key bank, each of these wheels bearing type corresponding to the inscription on the keys associated with each type wheel.

Three date wheels 2781 are provided, referring to Fig. 24, rigidly mounted on nested hubs 280 and loosely mounted on the shaft 276. These hubs are of the same construction as those illustrated and described in Patent No. 1,394,256 and will as a consequence not be specifically described. It is sufficient here to state that the hubs 280 are provided with knurled edges 281 by which they may be pulled forward relative to each other so that the hub may be firmly gripped and turned to set the date type wheel associated therewith.

An aligning means is provided for each of the date type wheels to insure that they will be in proper alignment for printing and this means comprises, referring to Fig. 10, toothed wheels 1279 meshing between the type of the type wheels 2781, the said toothed wheels being loosely mounted upon a horizontally disposed shaft 1280. Cooperating with the teeth of each of the wheels 1279 is a retaining pawl 1281 loosely mounted upon a shaft 1285 and held in engagement with the said teeth by means of a coiled spring 1283 compressed between the rear edge of each pawl and a spring housing 1284. The spring pressed pawls 1281 through the toothed wheels 1279 will insure at all times the proper movement of the type wheels 2781 so that they will always be in proper alignment for printing.

The printer type line is provided with six type wheels 285 (Fig. 24) which are for the purpose of printing the depositor's account number, stock numbers, bond numbers and the like, and these type wheels are loosely mounted upon a sleeve 286 which is secured against rotation by being attached to the framework 261. Meshing with each of the type wheels 285 is a bevel crown gear 287, referring to Figure 31, these bevel crown gears being mounted upon nested sleeves 288 which are loosely mounted upon a stud 289 carried by a bracket 290 supported by the printer framework. Also meshing with the bevel crown gears 287 are pinions 291 which are fast upon nested sleeves 292 loosely mounted upon a shaft 293 supported by the printer framework 261. Each of the nested sleeves 292 also carries rigidly secured thereto a gear wheel 294 and a ratchet wheel 295. Meshing with the teeth of each of the gears 294 are the teeth of a segment 296 pivotally mounted upon a rod 297 carried by parallel brackets 298 extending outwardly from the printer framework 261. Integral with each segment 296 is a forwardly extending handle 299, which projects through a slot 300 made in a housing 301 secured to the printer framework 261. By referring to Fig. 10 it will be seen that the spaces between the slots on the housing 301 are provided with numerals which are the same as those the type wheels 285 carry on their outer peripheries. By adjusting a handle 299 in the slot 300 so that a pointer 302 carried by the handle is opposite one of the numerals adjacent the slot, through the segment 296, gear 291, and bevel crown gear 287, the associated type wheel 285 will be set to position a type commensurate with the number opposite the pointer on the handle. By this mechanism the handles 299 may be adjusted to set upon the type wheels 285 the depositor's account number, a stock certificate number, and the like. A bracket 303 is secured to the rear edge of the printer framework 261 (Fig. 30) to which is pivoted at 304 retaining pawls 305 the noses of which cooperate with the ratchet wheels 295. Each pawl is held in engagement with its ratchet wheel by means of a coil spring 306 compressed between the tail of the pawl and the tail of a lever 307 which abuts against the bracket 303 and is pivotally supported on the said bracket at the point 304. The retaining pawls 305 insure that the type wheels 285 will be retained in the positions to which they are set by the manipulation of the handles 299.

After the racks 266 have been positioned by the actuation of the differential actuators as determined by the keys depressed in the various key banks, and before an impression is taken from the type wheels associated with these racks, a mechanism is operated which is for the purpose of preventing the printing of ciphers to the left of the highest denomination represented by a digit other than a cipher in any printed number and permitting the printing of ciphers to the right. This mechanism which is known in the art as a "zero elimination mechanism" will not be specifically described herein, the mechanism being partially illustrated in Fig. 18, and reference is made for a detail description thereof to Patent No. 1,311,884 for the reason that the same zero elimination is used here as is shown and fully described in the said patent. This mechanism in general terms comprises hooked levers 1242 which cooperates with notches 1243 in the upper edges of the racks 266. At the proper time during the operation of the machine these hooked levers 1242 are moved into engagement with the notches 1243 and the said levers given a backward movement through links 1244 and 1245, the last mentioned link carrying an anti-friction roller 1246 which fits within a cam groove 1247 in a disk 1249 fast upon the printer drive line shaft 242. Through this mechanism all of the racks 266, to the left of the rack which has been set to represent the highest digit in the number to be printed are drawn backward to move the type wheels associated therewith from their normal zero printing position to a non-print position.

After the date type wheels 2781 have been positioned by the manipulation of the knurled edges 281; after the ledger type wheels 285 have been positioned by the handles 299; and after the type wheels 277 have been positioned by the operation of the differential actuators determined by the keys depressed in the amount banks, teller's bank, and transaction bank of keys, as has been heretofore fully described, an aligning mechanism is operated to hold the type wheels 277, 1277, and 285 against movement during the time when several impressions are taken from the said type wheels.

This aligning mechanism, referring to Figs. 18 and 20, comprises two aligner members 338 and 339 fixed upon a shaft 340, the aligner 338 cooperating with the gear wheels 274 which are actuated by the racks 266 and the aligner 339 cooperating with the ledger type wheels 285 themselves. At the proper time during the operation of the machine after all of the various type wheels have been set, these two aligners 338 and 339 are rocked into engagement with the gear wheels 274 and ledger type wheels 285 respectively by the rocking of the shaft 340. Rocking movement is imparted to this shaft by a link 342 which is pivotally connected to the aligner 338, the other end of the said link being pivotally connected at 343 to a lever 344 which is pivotally mounted upon a stud 345. The lever 344 is forked to form two arms; the outer end of each of which carries an anti-friction roller 346 each cooperating with one plate of a double plate cam 347 which is fast upon the printer drive line shaft 242. It will be seen from the above, that when the shaft 242 is rotated, through the medium of the cam 347, rollers 346, lever 344, and link 342, the shaft 340 will be rocked at the proper time to engage the aligner members 338 and 339 with their respective gears and type wheels so that these will be held against movement during the time in which impressions are taken from the type upon the said type wheels.

The detail strip 348, referring to Figs. 5, 10, 15, and 29, is fed from a supply roll 349 beneath the upper printing platen 362 and onto a receiving roll 369 in the same manner and by identically the same mechanism as is fully illustrated and described in Patent No. 1,394,256. This mechanism will not be specifically described here, it being sufficient to state that the detail strip 348 is shifted, to provide the autographic features, and to position it in printing position, by the actuation of a lever 356 which is rocked by means of an arm 378 pivoted thereto (Fig. 29) which carries an anti-friction roller 380 fitting within a cam groove 381 made in a cam 382 fast upon the printer drive line shaft 242. The feeding of the detail strip to space the impressions made thereupon is accomplished by means of a lever 383 which is actuated by a bell crank lever 386 having one arm operatively connected thereto, and having its other arm 389 provided with an anti-friction roller 390 which cooperates with the peripheral edge of the cam 382 (Fig. 29). At the proper time during the operation of the machine the said levers 386 and 356 both shift and feed the detail strip. Manually adjustable means, comprising a hand lever 405, is provided, by means of which the distance between the impressions made upon the detail strip may be adjusted, so that space may be left beneath a printed item to write with a pencil any notation relating thereto. Since the functions and operations of the lever 405 are identical with the lever bearing the same number illustrated and fully described in said Patent No. 1,394,256 a specific description of this mechanism will not be given herein but reference may be had to the said patent.

A fragmentary portion of a printed detail strip is illustrated in Fig. 27. The amount 150 appearing on the first line is the amount of the depositor's old balance, this being indicated by the word "Old" printed in a column to the left and the depositor's account number which is 4237 is printed in a column to the right. The amount 150 is printed in the balance column. The amount 75.65 appearing in the next line is the total amount of the depositor's deposit, this being indicated by the abbreviation "Dep." appearing in the column to the left. The depositor's account number is repeated in this line and the initial "B" to the left of the abbreviation "Dep." indicates that this deposit amount was handled by teller "B." The amount 75.65 is printed in the deposit column. The amount 225.65 which appears in the third line is the amount of the depositor's new balance this being indicated by the word "New" appearing in the column to the left. The depositor's account number is again repeated in the column to the right. The amount 225.65 is printed in the balance column. The amounts 35.00 and 40.65 which are printed in the balance column indicate the amount of cash and miscellaneous checks which made up the deposit. This is indicated by the abbreviations "Ca." and "Mc." appearing in the column to the left. The amount $500.00 appearing in the next line indicates the amount of an old balance this being indicated by the word "Old" appearing in the column to the left. This depositor's account number, which is 5216, is printed in the column to the right. The amount 320.00 indicates the amount of a withdrawal which is shown by the letter "W" appearing in the column to the left. The initial "E" indicates that teller "E" handled this withdrawal transaction. The amount 320.00 is printed in the withdrawal column. In this transaction the depositor's account number 5216 is again repeated. The amount 180.00 indicates the amount of the depositor's new balance which is also indicated by the word "New" appearing in the column to the left. The amount 180.00 is printed in the balance column. The depositor's account number 5216 is again repeated.

Cooperating with the detail strip is a platen for making an impression thereupon from the type wheels after they have been positioned in the manner heretofore described. As previously stated, the type wheels 277 are of a diameter to contain one set of type on the upper half of their periphery and another set of type on the lower half of their periphery. The impressions made on the detail strip are taken by a platen from the set of type on the upper half of the periphery of the type wheels. It is always desired that an impression be made on the detail strip during every operation in order to have a listing of all transactions. The rubber platen 362 referring to Fig. 13, is mounted within a housing 361 carried by two parallel arms 360 which are integral with a sleeve 357 loosely mounted upon the rod 358. The detail strip as was previously described passes between the platen 362 and the type wheels 277, 285 and 1277 and as a consequence when the platen is brought down against the type wheels impressions are made upon the said strip by an ink ribbon as will be hereinafter explained in detail.

The mechanism for rocking the platen 362 for making an impression on the detail strip, comprises an arm 488 which extends substantially parallel to the arms 360 and projects outwardly beyond the platen housing 361. Pivoted to the projected portion of the arm 488 at the point 489 is the upper end of a link 490, the lower end of which is pivoted at 491 to a lever 492 which is fast upon a shaft 493 to which are also secured two spaced and projecting arms 494 (Fig. 16) which carry at their outer ends anti-friction rollers 495 cooperating with the plates 496 of a double plate cam which is secured to one end of a sleeve 497 loose upon a shaft 379 (Fig. 9). A Geneva plate 498 is secured to the other end of the sleeve 497, the notches 500 thereon being adapted to receive a pin 501 which is carried by a disc 504 fast on the printer drive line shaft 242. At the proper time during the operation of the machine the pin 501 will operate the Geneva plate 498 one step during every rotation of the shaft 242 and this rotation of the Geneva plate through the lever 494, shaft 493, lever 492, link 490 and lever 488 will rock the platen 362 clockwise against the type wheels 277. The rocking movement of the lever 494 is occasioned by the cam 496, and when the Geneva plate 498 is actuated by the pin 501 as above described, the cam 496 will first cause a clockwise movement of the platen 362 against the type wheels 277 and then a counter-clockwise movement of the platen away from the type wheels. The movement of the platen 362 through the pin 501 occurs subsequent to the shifting of the detail strip to bring the previous printing impression below the platen and also subsequent to the feed of the detail strip so that the impression of the platen through the medium of the pin 501 will cause an impression to be made on the detail strip beneath the previous impressions made thereupon.

As has been previously described, it is one of the objects of the present machine to provide a mechanism whereby the total amount of deposit, the total amount of withdrawal, and the amount of the new balance are printed in separate columns on both the detail strip, the depositor's ledger card, and the depositor's pass book. This result is accomplished by sliding a certain number of the amount type wheels so that impressions are made at different points upon the printing mediums, the sliding of the type wheels being occasioned by the actuation of the differential which is associated with the balance key bank and controlled by the manipulation of the keys therein. No type wheel is associated with the balance key bank and the keys in this bank are only for the purposes of controlling the sliding of the amount type wheels as previously mentioned.

The mechanism for sliding the type wheels will now be described. A plate 505 having an opening to receive the outermost sleeve 275 is positioned adjacent the right hand face of the outside type wheel 277 as viewed in Fig. 24. The sixth amount type wheel 277 reading toward the left (Fig. 24) has an annular recess to receive a disc 506 that carries pins 507 (Fig. 17) which project through slots 508 made in the type wheels, the said pins being also fastened to the plate 505. Due to this construction the six type wheels are secured together by means of the connected plate 505 and disk 506. Attention is called to the fact that the sleeves 275 which support the type wheels 277 are formed in two parts and have a connection of the character shown in Fig. 32, one portion of the sleeve having a projection 509 and the other portion of the sleeve a recess 510 to receive said projection. Due to this construction the type wheels 277 which lie between the plate 505 and disk 506 may be slid, by means hereafter to be described, back and forth between the printer frameworks 261 and at the same time be rotated to their set positions through the actuation of the gears 274 which are driven by the printer racks 266 as has been previously described, the slots 508 permitting such rotation. It will be noticed that three of the amount type wheels 277 are not included within the plate 505 and disk 506 and as a consequence these three wheels are not slid. This construction is provided for the reason that during adding operations only six slidable type wheels are necessary in order to print the amount of a deposit, withdrawal or balance transactions in the depositor's pass book or on the depositor's ledger card. However, during total taking operations at the close of the day when it is desired to take the total of all cash, miscellaneous checks, foreign checks, etc. a greater number of type wheels than six is often required to print such totals and as a consequence during such a total taking operation all of the type wheels 277 may be required. During such total taking operations the amount printed will be impressed in the withdrawal column, this column being selected merely for the reason that it is closer to the indicating characters which are printed in a column at the extreme left of the detail strip, upon which said totals are printed. The slidable type wheels during such total taking operations will always be returned adjacent the non slidable amount type wheels for the reason that during a total taking operation of this character only the release key is depressed and this key, as will be hereinafter described, positions the sliding type wheels in the withdrawal column. The plate 505 (Fig. 17) is secured to one side of a casting 511 which is loosely mounted upon a drum cam 512 mounted upon a shaft 513 which is supported in parallel brackets 514 (Fig. 24) integral with a cross bar 515 secured at each end to the parallel frameworks 261. The casting 511 also carries a stud 516 the inner end of which supports an anti-friction roller 517 which is mounted within a cam groove 518 in the face of the drum cam 512. A guide bar 519, secured to the cross bar 515 and having a vertically extending portion 520 projecting within a longitudinal slot in the casting 511, prevents the said casting from being rotated while permitting it to be slid longitudinally. The casting 511 is slid longitudinally to slide the type wheels 277 by rotation of the drum cam 512, the cam slot 518 in the drum cam engaging the anti-friction roller 517 carried by the stud 516 which is supported by the casting 511. The drum cam 512 is rotated by means of a gear 521 (Fig. 15) fast upon the shaft 513, which gear meshes with a pinion 522 loosely mounted upon a stud 523 carried by one of the brackets 514. The pinion 522 meshes with a large gear 524 which is fast on one of the sleeves 275 (Fig. 24). This sleeve also has secured thereto a gear 274 which meshes with the teeth 273 formed on a printer rack 266 which is driven by the differential associated with the balance bank in exactly the same manner as the other printer racks 266 heretofore described. From this construction it will be seen that the gear 524 will be rotated commensurate with the actuation of the differential under the control of the keys in the balance bank. This movement of the gear 524 through the pinion 522 and gear 521 will rotate the drum 512, which will, through the engagement of the cam slot 518 therein with the anti-friction roller 517, slide the casting 511 a distance commensurate with the key depressed. Since the plate 505 which is secured to the amount type wheels 277 is also secured to the casting 511, they will be slid to a position commensurate with the key depressed in the balance bank. Due to this construction, when the deposit key is depressed six of the amount type wheels which are secured to the plate 505 will be slid to a position so that an impression will be made upon the different printing mediums in the deposit column, when the withdrawal key is depressed the amount set on these type wheels will be impressed in the withdrawal column, and when the balance key is depressed the amount set up on the wheels will be printed in the balance column. The cam slot 518 is so shaped that when the release key is pressed the type wheels 277 that are secured to the plate 505 will be shifted to the position in which they will print in the withdrawal column at which time they lie against the type wheels 277.

An aligner mechanism is provided for aligning the shiftable amount type wheels after they have been positioned in their shifted positions and set by the racks 266 under control of the amount keys, so that they will be in correct position and held against movement during the time in which the several impressions are taken therefrom. This aligning mechanism, referring to Fig. 15, comprises an aligner 525 which is designed to be moved into engagement with the shiftable amount type wheels 277 and between the type thereon. This aligner is fast upon a shaft 526 having bearings within the printer framework 261, and also fast upon the said shaft is a downwardly extending arm 527 which carries a pin 528 (Fig. 13) fitting within the bifurcated end 529 of a pitman 530, a spring 1531 stretched between a stud carried by the arm 527 and a stud carried by the pitman 530 serves to hold the pitman in engagement with the pin 528. The pitman 530 is bifurcated to surround the printer drive line shaft 242 and carries an anti-friction roller 531 which fits within a cam groove 532 formed in a plate 533 fast upon the printer drive line shaft 242. At the proper time during the operation of the machine, through the cam slot 532 and anti-friction roller 531 the pitman 530 is moved to the left, as viewed in Fig. 13, moving the bifurcated end 529 of the said lever away from the pin 528 and thereby permitting the spring 1531 to rock the arm 527 clockwise causing an engagement of the aligner 525 carried thereby with the shiftable amount type wheels 277. A hook 534 (Fig. 15) is secured to the aligner 525 and when the said aligner is rocked into engagement with the shiftable amount type wheels, this hook member will engage a lug 535 made integral with the plate 505 and thereby counteract any warping action of the shiftable amount type wheels during the time when the several impressions are taken therefrom.

The printing mechanism herein disclosed has an impression device provided with means whereby it may be set to make either one or two impressions upon an inserted pass book, deposit slip, and ledger card and the impression means is so controlled by the printing mediums that should none of them be inserted in the machine to receive an impression, the impression device would not be actuated. An ejecting mechanism is also provided which cooperates with this impression mechanism so that when a deposit slip and pass book are inserted in the machine, after an impression has been made upon the deposit slip it will be ejected so that an impression may be made upon the pass book. The mechanism for printing upon the deposit slip, pass book, and ledger card or other paper inserted in the machine will now be described in detail. A horizontally disposed table 592 (Figs. 15, 21, 22 and 23) is arranged beneath the type wheels, the table forming a support for the inserted printed mediums while they are being printed. The table 592 is supported by the front printer framework 261 and by forwardly extending arms 594 carried by the innermost printer framework 261 (Fig. 21). The table 592 is provided with an opening 593 to receive a platen 595 (Fig. 15) when the platen is moved upwardly by means hereafter to be described to force the inserted printed medium against the type wheels 277, 1277 and 2781. The platen 595 is mounted in a U-shaped framework 596 carried by U-shaped housing 597 made integral with the free ends of two horizontally disposed arms 598 which are connected near their other ends by a bar 599 and are provided with hubs 1599 loosely mounted upon the shaft 493 which is supported in the parallel frameworks 261. The U-shaped housing 597 is provided with a downwardly extending ear 601, to which, at the point 602 a link 603 is pivoted, the said link being pivoted at 604 to another link 605 which is pivoted upon a pin 606 carried by the forward end of a lever 607 loosely mounted upon the shaft 493. The lever 607 extends to the left, as viewed in Fig. 15, beyond its pivotal connection with the shaft 493 to form an arm 608 which is forked to form two arms 609 each of which carries at its outer end an anti-friction roller 610. The rollers 610 cooperate with the peripheries of two cam plates 611 which together form a double plate cam that is secured to one end of a sleeve 612 (Fig. 9) loosely mounted upon the shaft 379. The other end of the sleeve 612 carries a Geneva plate 600. With the notches 6001 of the Geneva plate 600, two pins 613 and 614 carried adjacent the periphery of a disc 615 secured to a sleeve 616 splined upon the printer drive line shaft 242, are adapted to cooperate. The sleeve 616 carrying the disc 615 is adapted to be slid black and forth upon the shaft 242 so as to position the pin 613 in the same vertical plane as the Geneva plate 600 or to move it out of such position. The pin 614 is of a length to always be in the same vertical plane as the Geneva plate 600 irrespective of whether or not the disc has been shifted to position the pin 613 in the path of or in the same vertical plane as the said Geneva plate. When the parts are in the position shown in Fig. 9 and the machine is operated, the disk 615 will be rotated by the rotation of the shaft 242 and the pin 614 will engage the Geneva plate 600 to move it one step. The one step of movement of the Geneva plate 600 will actuate the plate cam 611 to rock the lever 608 up and down once. The movement of the lever 607 through the links 605, 603, and ear 601 of the platen housing 597 will lift the platen 595 against the type wheels 277. An upward movement of the lever 607 will lift the platen 595 as just described for the reason that the two links 603 and 605 are held in substantial direct alignment by a spring 622, hereafter to be described, and hence they will move together as a substantially solid piece. These links are normally in the position illustrated in Fig. 15 and are only shifted from this normal position when no printing medium is present upon the table 592 as will be hereinafter explained.

The character of the impression made by the platen 595 may be controlled by adjusting a cam 617 pivoted at 618 to the arm 607 and bearing at 619 against the lower link. The arm is held in different positions by a set-screw 620 cooperating with a slot 621 in the member 607. The construction is such that after final adjustment of the platen, the pivot 604 will lie to the rear of a line through the point 602 and the pin 606 to permit the toggle formed by said links to collapse when the printing mediums in position are thicker than those for which the adjustment was primarily made, and when no printing mediums are in position, as will be later set forth. The spring 622 secured as shown is provided for holding the lower link against the cam, and moving the same toward the cam after the toggle has been collapsed.

The means for sliding the disk 615 so as to move the pin 613 out of or into the path of the Geneva plate 600 so that either one or two impressions may be made by the platen 595 comprises, referring to Figs. 5, 6, 7 and 22, a shaft 439 protruding beyond the outermost printer framework 261 and carried thereby and upon this protruding portion thereof a sleeve 440 is rotatably mounted, the inner end thereof having a disc like portion 441 which is coupled to a tooth segment 442 made on the inner end of a sleeve 443 which fits within the sleeve 440, by means of a pin 1443 carried by the segment which passes through an opening made in the disc 441. Due to this construction, rotation of the sleeve 440 causes a rotation of the tooth segment 442 which meshes with the teeth of another segment 444 loosely mounted on the protruding end of a shaft 445 supported by the parallel printer frameworks 261. A casting 448 (Fig. 6) which is loosely mounted upon the shaft 445 is secured to the segment 444 by means of screws 449. This casting has a rearwardly extending arm 450 which carries on its face adjacent the shaft 445 a pin 451 which fits within an irregularly shaped cam groove 452 made in a casting 453 which is pinned to the shaft 445. Due to this construction, when the sleeve 440 is turned, the end of the sleeve being knurled so as to facilitate this object, through the segments 442 and 444, and casting 448, the pin 451 is oscillated. The cam slot 452 is so shaped that the oscillation of the pin 451 within the said slot will cause the shaft 445 to be slid back and forth longitudinally. In some instances the oscillation of the pin does not directly effect movement of the shaft but merely sets up a condition to control the movement of said shaft upon operation of an automatic check control hereinafter described.

Loose upon the shaft 445 and held in place by a collar 4541 pinned to the shaft, is a yoke-shaped sleeve 454 (Fig. 9) provided with an arm 455 which is forked to fit within an angular groove 456 in the sleeve 616 which carries the disc 615. When the shaft 445 is slid back and forth by means of the oscillation of the pin 451, through the arm 455 and groove 456, the sleeve 616 and consequently the disk 615 is slid back and forth upon the shaft 242. In case the sleeve 440 is so turned that a position marked "one print" thereon is moved to a position on top of the stud shaft 439, the shaft 445 through the mechanism just described will be caused to slide a distance sufficient to move the disc 615 so that only its long pin 614 is in the same vertcial plane as the Geneva plate 600.

Means is provided for locking the sleeve 440 in its moved position and this means comprises two holes 457 in the disc 441 which are adapted to receive a pin 458 (Fig. 7) carried by and projecting from the outermost printer framework 261. A coiled spring 459 positioned between a shoulder on the sleeve 440 and an annular flange made on the outer end of the sleeve 443 normally holds the sleeve 440 in its innermost position in which the pin 458 projects through one of the openings 457 made in the disc 441. When it is desired to turn the sleeve 440 for shifting the disk 615 as above described, the sleeve 440 is slid outwardly sufficient to disengage the disc 441 from the pin 458, and when in this disengaged position is turned in the desired direction. The pin 1443 which provides the coupling means between the disc 441 and the toothed segment 442 is long enough to permit the disc 441 to be slid outwardly to disengage the pin 458 without disengaging the pin 1443. After the sleeve 440 has been turned so that the portion marked "one print" is on top of the shaft 439 it is permitted to be returned to its normal position by the spring 459 so that one of the openings 457 in the disc 441 receives the pin 458 and thereby holds the sleeve 440 in this moved position. When the sleeve 440 is moved so that a blank space formed thereon is on the top of the shaft 439, through the mechanism just described the disk 615 will be caused to slide on the shaft 242 a distance sufficient to position both the pins 613 and 614 in the path of the Geneva plate 600 so that when the shaft 242 is rotated the Geneva plate will receive two steps of movement which will cause the platen 595 to be raised against the type wheels and moved away therefrom twice during the operation of the machine.

The sleeve 440 normally should be turned so that the blank portion thereon is on top of the shaft 439, in which position the platen 595 will be actuated to make two impressions. The sleeve 440 should be so set for the reason that during banking hours two printing mediums are more generally present in the machine when it is operated. It is only after banking hours when the ledger cards are placed in the machine to receive an impression of the deposit made during the day and previously printed on the pass book that the sleeve 440 should be turned to its "one print" position. However, during banking hours there are some transactions made by the machine in which only one printing medium is present upon the table 592 and at such a time it is desirable to have the platen 595 make only one impression.

In order to accomplish this result and also obviate the necessity of turning the sleeve 440 into "one print" position, an automatic mechanism is provided for so controlling the disk 615. This automatic mechanism is substantially identical with that illustrated and fully described in Patent No. 1,394,256 and as a consequence this mechanism will be but briefly described herein. It is sufficient to state that the printer rack 266 which is associated with the balance key bank positions a cam 475 (Fig. 18) commensurate with the actuation of the differential mechanism controlled by the keys in the balance key bank. Levers 477 and 478 (Fig. 19) cooperate with the cam 475 and a cam 487 carried by the printer drive line shaft 242 to position, through the medium of a hook lever 482 and a pin 480 carried by the lever 478, a pin 1445 projecting outwardly from a segment 462 which is fast upon the inner end of the shaft 445. Rigid with the lever 482 are two arms carrying rollers cooperating with the cam 487 to oscillate said lever first clockwise, then counter clockwise to position the disk 615, and then clockwise back to normal. One end of said lever is provided with an inclined surface for cooperation with the pin 480 and the other end with an elongated slot to cooperate with the pin 1445. The cam 475 and levers just described are so constructed that when the sleeve 440 has been turned to position the disk 615 so that both the pins 613 and 614 will actuate the Geneva plate 600, should the "balance" key, "deposit" key or "withdrawal" key in the balance bank be depressed, the position of the disk 615 would not be disturbed. This is for the reason that during these transactions it is desirable that the platen 595 make two impressions since at such time two printing mediums are present upon the printing table 592. When, however, the "release" key is depressed through the cam 475 and associated levers just described, the pin 1445 will be rocked counter-clockwise to the position shown in Fig. 19 and left there. This movement of the pin 1445, through the segment 462 to which it is attached, will rock the shaft 445 counter-clockwise and thereby, through the medium of the cam 452 slide the said shaft 445 a distance sufficient to move the disk 615 so that the said pin 613 is out of the path of the Geneva plate 600. As a consequence when the printer drive line shaft 242 is rotated the platen 595 will receive only one actuation although the sleeve 440 is set in the position in which two impressions would ordinarily be made thereby. This automatic mechanism is actuated by the depression of the release key for the reason that the release key is only operated during business hours when a pay check is present in the machine and since this check is inserted alone, only one impression of the platen 595 is desired.

Attention is called to the fact that the automatic mechanism herein operates in a manner reverse to that described in Patent No. 1,394,256 heretofore mentioned. In the said patent the automatic mechanism positioned the associated cam one step additional from whatever position in which it had been set by the manual control, whereas in the present machine the automatic mechanism positions the cam one less step from its two print position but has no effect on it in its one print position.

The mechanism which is provided for preventing an operation of the platen 595 when no printing medium is present upon the table 592 will now be described. This means comprises, referring to Figs. 5 and 15, a vertically disposed feeler arm 636 which is adapted to project through an opening 6361 (Fig. 21) in the table 592 so as to come into engagement with the under side of the printing medium positioned upon the table. The feeler arm 636 is carried by one end of a bell crank lever 637 loosely mounted upon the shaft 493. The other arm 638 of the bell crank 637 extends downwardly and has flexibly connected thereto by means of a rod 655 one end of a link 639, the other end of the link 639 being pivoted at 640 to an arm 641 fast upon the outer end of a shaft 642 carried within the parallel printer frameworks 261. The rod 655 also connects the lower end of an arm 6638 yoked to the arm 638 to a link 656 which extends to the left, as viewed in Figs. 5 and 12, and is curved at 6561 to straddle the printer drive line shaft 242. Mounted upon the portion 6561 is an antifriction roller 6562 which is held upon the periphery of a cam 657 fast upon the shaft 242 by a spring 643 stretched between the rod 655 and a stud 644 carried by the outer printer framework 261. At the proper time during the operation of the machine and previous to the operation of the platen 595, the cam 657 is rotated to move its high point away from the roller 6562 carried by the link 656, thereby permitting the said link and lower end of the lever 638 to be moved toward the right, as viewed in Fig. 5, under the action of the spring 643. This movement of the arm 638 will cause the other arm 637 of the bell crank and feeler arm 636 to be rocked counter-clockwise and lift the upper end of the said feeler arm through the opening 6361 in the table 592. If a printing medium of some kind is present upon the said table the feeler arm will be stopped thereby and held in engagement with the lower surface thereof by the spring 643. If, however, there is no printing medium present upon the table 592 the feeler arm 636 will be rocked upwardly by the spring 643 to the limit of its clockwise movement as determined by the cam 657. This action of the feeler arm 636 will, through the arm 638, link 639 and arm 641 rock the shaft 642 counter clockwise, so that a pin 6571 (Fig. 15) carried by the upper end of an arm 658 fast upon the shaft 642 will be rocked into the path of a projecting arm 659 made integral with the link 605. When the parts are in this position and the lever 607 lifts the platen 595 to make an impression, the projecting arm 659 of the link 605 will engage the pin 6571 and be rocked clockwise thereby breaking the toggle between the lever 607 and the ear 601 of the platen housing 597, this toggle comprises the links 605 and 603. When the toggle is broken as just described the movement of the lever 607 is taken up by the clockwise rocking of the link 605 and the platen housing 597 receives no actuation. When a printing medium is present upon the table 592 the shaft 642 is not rocked and as a consequence the pin 6571 will not provide an interference for the arm 659 and the toggle comprising the links 605 and 603 will not be broken.

As previously stated the various printing mediums which are to receive an impression from the platen 595 are supported by the table 592. In addition, however, these printing mediums are also supported by a shiftable carriage so that they may be positioned to receive the impressions from the type wheels upon any desired portion thereof. This carriage comprises a table 675 (Figs. 21, 22 and 23) the upper surface of which is arranged in the same horizontal plane as the table 592, and has two parallel downwardly extending ears 676 which are provided with aligned openings to receive a shaft 677 which is rotatably mounted in bearings made in parallel brackets 678 extending forwardly from and made integral with the outermost printer framework 261, (Figs. 5, 21 and 22). Attached to the upper surface of the table 675 and adjacent the outer edges thereof are two parallel arranged and rearwardly extending bars 679 which are joined at their inner end by a tie rod 680. The tie rod 680 rests beneath metal rollers 681 which are rotatably mounted upon studs 682 carried by the innermost printer framework 261. The rollers 681 prevent any tilting action of the table 675 and hold it in the same horizontal plane as the table 592. Each bar 679 as is shown in Fig. 33 is provided with two stepped flanges 683 and 684 the purpose of which will be hereafter explained. Secured to the upper face of each bar 679 and projecting over the two stepped flanges 683 and 684 is a plate 685 which at its outer end is flared upwardly at the point 686 (Fig. 22) providing a means for directing an inserted printing medium onto the stepped flange 683. Secured to the upper face of the table 675 and adjacent the edges thereof are two abutment guides 687 which are curved downwardly and support thin metal guides 688 which terminate adjacent the front edge of the table 592 and form the means for directing an inserted printing medium onto the stepped flange 684.

In the case of a deposit transaction a deposit slip and a depositor's pass book are placed in the machine. In inserting them in the machine the pass book, which is of the type illustrated in Fig. 25, is opened to the page which is to receive the impression and placed upon the shiftable table 675. It is then pushed inwardly beneath the guide plate 688 and onto the stepped flange 684, the under side of the guide plate 688 providing the means for directing the pass book to its position upon the said stepped flange 684. The deposit slip is then placed on top of the guide plate 688 and beneath the upwardly flared portion 686 of the guides 685. When a deposit slip has been put in this position it is slid inwardly, and using the aforementioned guide plate is directed onto the upper stepped flange 683 where it is in a position above the pass book which rests upon the stepped flange 684. After the pass book and deposit slip have been inserted in the printing mechanism as just described, the shiftable carriage 675 is moved to position them so that the impressions of the platen 595 will cause an impression to be made in the next vacant line in the pass book. By referring to Figs. 25 and 26 it will be seen that the lines on both the depositor's pass book and ledger card are numbered and after ascertaining the number of the next blank line in the pass book or ledger card by moving the paper carriage until a pointer 689 carried by the carriage is opposite an index number 690 made on the face of the table 592, which number agrees with the number of the next blank line, when the impression mechanism is operated an impression will be made in the line bearing the index number. The deposit slip which is illustrated in Fig. 28 has no numbered lines like the pass book and the depositor's card for the reason that such lines are not necessary since only two impressions are made upon the deposit slip and these occur in the same line.

From the description thus far given it will be seen that the printing mediums are placed upon the shiftable paper carriage and slid to position the correct line to receive the various impressions and that the type wheels are shifted under control of the keys in the balance bank to print the various amounts in the proper designated columns which cross the numbered lines at right angles.

An aligner mechanism is provided for holding the shiftable carriage 675 in its adjusted position during the time in which the several impressions are made upon the printing mediums carried thereupon. This aligning mechanism, referring to Figs. 11 and 22, comprises a toothed bar 691 secured to the under face of the shiftable table 675 and positioned adjacent the inner edge thereof, cooperating with the teeth of which is provided an aligner pawl 692 which is pivoted at 693 to a lever 694 which is secured to a sleeve loose upon the shaft 493. The lever 694 has a lip 695 which extends across the upper edge of the pawl 692 and is held in engagement therewith by means of a spring 696 which is stretched between the end of the pawl 692 and a stud 697 carried by said lever. Due to this construction, the pawl 692 and lever 694 move together as a substantially unitary piece, the spring 696 however providing means whereby the pawl 692 may yield relatively to the lever 694 to align the rack 691 instead of mashing the teeth thereof as might otherwise result when the aligner were rocked into mesh therewith should the spring 696 not be provided. The means for rocking the aligner 692 into engagement with the teeth of the rack bar 691 comprises a lever 698 (Fig. 11) fast upon the sleeve to which the lever 694 is secured and carrying on its end an anti-friction roller 699 which cooperates with a cam 700 fast upon the printer drive line shaft 242. When the parts are in the position illustrated in Fig. 11 the roller 699 is opposite a cut away portion in the cam 700 thereby permitting the lever 698 to be rocked clockwise and thereby allowing the aligner pawl 692 to also be rocked clockwise out of engagement with the teeth of the rack bar 691. However, when the printer drive line shaft 242 is rotated during the operation of the machine, the cam 700 will engage the anti-friction roller 699 and rock the lever 698 counter clockwise and thereby engage the aligner pawl 692 with the teeth of the rack bar 691 and hold it in this position until the end of the operation of the machine when the cut out portion of the cam is again positioned over the roller 699. Due to this construction, after the shiftable paper carriage has been set to its desired position, during the operation of the machine it is locked against movement and is only freed at the completion of the actuation of the machine.

When a deposit slip and the depositor's pass book are inserted to receive an impression from the type wheels 277, 1277 and 2781, the deposit slip rests upon the upper stepped flange 683 and the pass book upon the lower stepped flange 684. When the depositor's ledger card and the pass book are inserted together, the pass book occupies the same position and the ledger card rests upon the upper stepped flange 683. In both cases a printing medium, in one instance the deposit slip and in the other instance the ledger card, is positioned above the pass book so that after an impression has been made upon this printing medium it must be ejected so that the second impression of the platen 595 may move the pass book against the type wheels to make an impression thereupon. This ejecting mechanism for the deposit slip and ledger card comprises, referring to Figs. 8, 21, 22 and 23, two knurled rollers 705 which are splined to the shaft 677 so that they are both slidable upon the said shaft and at the same time rotatable therewith. These knurled rollers project through openings made in the table 675 and the top of their periphery is arranged slightly above the level of the upper stepped flange 683. These rollers engage the under side of the deposit slip or ledger card which is present upon the stepped flange 683 and are slid back and forth upon the shaft 677 when the carriage 675 is moved to its desired position. Cooperating with each of the knurled rollers 705 is a small knurled roller 706 mounted directly above the roller 705 and rotatively mounted upon a stud shaft 707 carried by a U-shaped bracket 1708, the longer leg of the bracket being formed into an arm 708 which is loose upon a shaft 709 supported by parallel downwardly extending ears 1710 carried by the under face of the table 675. Each arm 708 carries a pin 710 which fits within the bifurcated end of a lever 711 which is also loose upon the shaft 709, the lower end of the levers 711 being connected by a rod 712. A coiled spring 713 having one end attached to the shaft 709 and its other end to the pin 710 normally tends to rock the arm 708 clockwise and thereby engage the knurled rollers 706 with the knurled driving rollers 705. When the machine is at rest, however, an anti-friction roller 714 which is in engagement with the rod 712 and carried by an arm 715 supports the rod 712 in a raised position as is shown in Fig. 23 wherein the rollers 706 are held spaced from the rollers 705. From this it will be seen that when the machine is at rest the knurled rollers 706 and 705 are separated to permit the insertion of the deposit slip or ledger card therebetween. After the deposit slip or ledger card has been inserted between the rollers 705 and 706 and the operation of the machine is started, the roller 714 is permitted to be lowered and thereby allow the knurled rollers 706 to come into contact with the knurled rollers 705. In order to lower the anti-friction roller 714 the arm 715 is loosely mounted upon the shaft 784 and has a slot 716 which receives a screw 717 carried by a lever 718 which is fast upon the shaft 784. The shaft 784, as will be hereinafter described, is rocked counter clockwise during the operation of the machine and this counter clockwise movement, which occurs shortly after the machine begins its operation, rocks the lever 718 counter clockwise (as viewed in Fig. 22) and thereby moves the pin 717 downwardly within the slot 716. The downward movement of the pin 717 frees the arm 715 and allows it to be rocked counter clockwise by the engagement of the anti-friction roller 714 carried thereby with the rod 712. From this it will be understood that after the deposit slip or ledger card has been inserted in the machine and the operation of the machine has started the knurled rollers 706 will be moved into contact with the knurled rollers 705 so that when the latter are rotated during the operation of the machine they will engage the upper and lower surface of the deposit slip or ledger card and eject it outwardly from its position above the pass book to a position where it will rest upon the table 675. The mechanism for driving the rollers 705 will now be described, and comprises, referring particularly to Figs. 21 and 22, a plate 719 fast upon the printer drive line shaft 242 which plate carries a pin 720 that is adapted to cooperate with the notches 721 in a Geneva plate 722 loose upon the shaft 379. Secured to the side of the Geneva plate 722 is a gear 723 which meshes with a pinion 724 loose upon the shaft 242. Secured to the pinion 724 is a large gear 725 which meshes with a pinion 726 which is fast to the inner end of a sleeve 727 loosely mounted upon the shaft 379. The forward end of the sleeve 727 carries a spiral gear 728 which meshes with a worm pinion 729 fast upon one end of a sleeve 730 loosely mounted upon a stud shaft (not shown) supported by the left hand bracket 678. The other end of the sleeve 730 carries a gear 731 which meshes with a gear 732 carried by a collar 733 pinned to the shaft 677.

During the operation of the machine when the printer drive line shaft 242 is rotated the pin 720 carried by the plate 719 will engage the Geneva plate 722, and through the gearing just described give the shaft 677 a number of rotations. The actuation of the shaft 677 will rotate the knurled rollers 705 which are splined thereto and thereby eject the deposit slip or ledger card with which they may be in engagement. It is to be understood that the construction and arrangement of the parts is such that the actuation of the rollers 705 occurs subsequently to the time that an impression is made upon the deposit slip or ledger card and previous to the second operation of the platen 595 to make an impression upon the pass book. In other words the ejection of the deposit slip or ledger card occurs intermediate the two impressions made by the platen 595. It will also be readily understood that since the deposit slip or ledger card rests upon the upper stepped flange 683 it alone will be engaged by the rollers 705 and 706 and the ejection of the ledger card or deposit slip will not disturb the pass book which lies upon the lower stepped flange 684.

By referring to Figs. 25 and 26 it will be seen that the amount of the new balance and the amount of the withdrawal or deposit are printed in the same numbered line and bear the same date. These amounts, however, are printed at different times and during different operations of the machine. The date is printed at the time the deposit or withdrawal transaction is printed and the same is true of the teller's initial. The new balance, however, is printed during a total operation when no teller's key is pressed and it is further desired that the date should not be printed again for should the date be printed twice the impressions would occur one on top of the other and would be bound to cause a blurr. As a consequence, a mechanism is provided for permitting an impression of the date at the time the withdrawal or deposit transaction is printed but an elimination of the printing of the date during the printing of the balance. This result is accomplished by providing a crippling mechanism for a portion of the lower platen controlled by the total lever so that during total taking operations the date will not be printed. This crippling mechanism, referring to Figs. 9 and 10, comprises an arm 735 pinned to the shaft 282 which is rocked by the actuation of the total lever. A link 736 has one end pivoted to the arm 735 and its other end pivoted at 737 to an arm 738 pinned to the inner end of a shaft 739 which is rotatably mounted in bearings made in two parallel arranged and downwardly extending ears 740 integral with arms 598. Also fast upon the shaft 739 is an arm 741 the upper end of which carries an eccentrically mounted pin 742 which fits within a slot 743 made in an arm 744 loosely mounted upon the shaft 493. The free end of the arm 744 is rounded at 745 to fit within a recess cut in a vertically movable plunger 746 reciprocatably mounted within the lower platen housing 597. The upper end of the plunger 746 is connected to a portion of the U-shaped housing 596 which is separated from the remaining portion of the said housing by a cut 747 (Fig. 9), the U-shaped housing 596 carrying a portion of the platen 595 which is also cut from the remaining portion thereof. Due to this construction when the shaft 282 is rocked through the movement of the total lever to either "read" or "re-set" position the link 736 will be rocked, which through the arm 738, lever 741, eccentric pin 742, slot 743, lever 744, and plunger 746, will cause the separated portion of the U-shaped housing 596 to be moved downwardly. This separated portion of the housing 596 and platen 595 is positioned directly beneath the date type wheels so that when the separated portion of the platen is lowered and a subsequent upward movement of the platen made to cause an impression, the lowered portion of the platen will not force the printing medium against the type wheels and as a consequence no impression will be taken therefrom. The slot 743 is so shaped that the plunger 746 will be lowered when the link 736 is rocked in either direction, the link receiving the rocking movement in one direction when the total lever is set to a re-set position and a rocking movement in the opposite direction when the total lever is set to a read position. When the total lever is set in the adding position the parts will be in the position illustrated in Fig. 10 in which the plunger 746 will not be lowered and the separated portion of the platen 595 will be in the same horizontal plane as the balance of the said platen. The pin 742 has secured thereto a knurled disk 1747 co-operating with the teeth of which is the retaining blade 748 supported by a projecting portion of the pivot pin 737. By adjusting the disk 1747, the amount of the rise and fall of the plunger 746 may be adjusted to assure that the separated portion of the platen 595 will occupy its correct relative position with respect to the balance of the said platen.

It has been previously explained that in order to print the total upon the total withdrawal totalizer which is located at the zero position of the transaction bank, no keys in that bank are depressed and the release key is depressed in order to start the machine. Means is provided for printing a character on the detail strip to show that the printed total was accumulated on the withdrawal totalizer. This printing mechanism is set by the total lever which cooperates with the printing mechanism associated with the transaction key bank so that when the total lever is moved one step to either its "total" or "re-set" position the type carrier associated with the transaction bank will not be moved to its non-print position but will occupy a zero position at which point the said type carrier is provided with a character "W" to print an indication of the total withdrawal instead of a dash. This mechanism, referring to Fig. 18, comprises teeth 750 made upon the upper edge of the printer rack 278 which is set by the total lever as previously described. Meshing with the teeth 750 are the teeth of a segment 751 which is loosely mounted upon a stud 752 held by the innermost printer framework 261. Above the stud 752 the segment 751 is provided with another segmental portion 753 the upper edge of which is provided with two teeth 754 which cooperate with a projection 755 made upon a lever 756 which is loosely mounted at one end upon a stud 757 carried by the innermost printer framework 1261. The left hand end of the lever 756 (Fig. 18) engages beneath an upwardly extending arm 758 which is attached to the hooked lever 1242 that cooperates with the printer rack 266 that is associated with the transaction key bank. When the total lever is in the adding position the projection 755 is in the position illustrated in Fig. 18 in which it rests between the teeth 754 made on the segmental portion 753 of the segment 751. When the lever 756 is in this position, the arm 758 is lowered a distance sufficient to permit the hooked lever 1242 to engage the hook 1243 of the printer rack 266 associated with the transaction key bank and move it from its zero position to its non-print position at the time the zero elimination mechanism is operated during the operation of the machine to move the associated type wheel into non-printing position. However, when the total lever 5 is moved to either its "read" or "re-set" position the printer rack 278 is actuated, as has been previously described, and this rack through the teeth 750, segment 751, teeth 754, and projection 755 will raise the lever 756 a distance sufficient to lift the arm 758 so that when the hooked lever 1242 is subsequently actuated to move the printer rack 266 associated with the transaction key bank out of its zero position, the said hooked lever will be held a distance above this rack 266 so that it will not engage it and as a consequence this rack will remain in its zero position. The type wheels associated with the rack 266 which is controlled by the transaction key bank in its zero position bears a character "W" and as a consequence when the hooked lever 1242 has been raised as just described so that it will not move this rack to its non-print position but will permit it to remain in its zero position this "W" will be printed, the character as previously described having the purpose of indicating the total standing upon the total withdrawal totalizer, which is located at the zero position of the transaction key blank.

An ink ribbon is passed around the type wheels mounted upon the shaft 276 so that it is positioned between the type upon the type wheels and the two platens 362 and 595. Referring to Fig. 10, the ink ribbon 760 is continuous and passes over rods 761 and 762 carried by the innermost printer framework 261, bracket guides 763 which position the ribbon between the platen 362 and the type wheels, and around an ink roller 764 rotatably mounted upon a stud shaft 765 carried by the innermost printer framework 261. Where the ribbon 760 passes from the ink roll 764 to the rod 761 it is positioned above the platen 595 and beneath the type wheels. Means is provided for feeding the ribbon, which comprises a ratchet 766 fast upon the shaft 765 cooperating with the teeth of which is a spring pressed pawl 767 pivoted to an arm 768 which is pivoted to the left hand end of a link 769 pivoted at 780 to a pivoted arm 781. The said arm is formed to straddle a pin 782 carried by the upper end of an arm 783 fast upon a shaft 784. Also fast to the shaft 784 is an arm 785 to the upper end of which is pivoted one end of a link 786 the other end of the link being bifurcated to straddle the printer drive line shaft 242 and carrying an anti-friction roller 787 fitting within a cam groove 788 (Fig. 11) formed in a plate 789 fast upon the said shaft 242. When the lever 781 is actuated through the cam groove 788 and associated levers just described, the link 769 is moved toward the left which causes the pawl 767 to feed the ratchet 766 one step, the feeding of the ratchet through the ink roller 764 feeds the ink ribbon 760 also one step. A roller 790 rotatably mounted upon a shaft 791 is held in engagement with the upper surface of the ribbon 760 by a spring (not

Operation.

Having described in detail the construction and operation of the various parts of the present invention a résumé of its operation will now be given.

When a depositor wishes to deposit a sum of money he hands his pass book together with a deposit slip to the receiving teller who first sets up the depositor's account number with the handles 299, sets up the amount of the depositor's old balance upon the amount key banks, and then depresses the "old balance" key and the "balance" key in the balance bank. The depression of the latter key releases the machine and during the first one half operation thereof the balance totalizer is slid to position its additive actuating pinions opposite the actuating teeth 110. After the said teeth have been differentially positioned and before they begin their return movement to normal position the balance totalizer is moved into engagement with the said teeth 110 so that upon return movement thereof to normal position the amount set up on the amount keys is added on the balance totalizer. The various differential units control the positioning of their corresponding type carriers through the connections shown in Figures 2 and 18. Simultaneously with the positioning of the type carriers 277 commensurate with the different keys depressed, the six amount type wheels secured between the plates 505 and 506 are slid through the drum cam 512 under control of the "balance" key in the balance bank to position them in the balance column for printing. After the type carriers are so positioned the upper platen 362 is actuated to print upon the detail strip 348 after said strip has been both shifted and fed through the levers 356 and 386 and their associated elements. At this time since there is no printing medium upon the shiftable table 675 the feeler arm 636 passes upwardly through the opening 6361 in the said table 675 and through the link 639 rocks the shaft 642 which positions the pin 6571 on the arm 658 in a position to engage the projecting portion 659 of the link 605 and thereby break the toggle connection between the said link and the link 603 so that a subsequent rocking of the arm 607 will not cause an impression of the platen 595.

The teller then places the pass book and deposit slip on the table 675 sliding the book inwardly on the lower stepped flange 684 and the deposit slip inwardly onto the upper stepped flange 683.

By sliding the table 675 he adjusts the next vacant numbered line in the pass book opposite the printing line using the pointer 689 and index numbers 690. At the start of the machine the liner pawl 692 is operated to engage the teeth of the rack bar 691 and hold the shiftable carriage 675 against movement during operation of the machine. He then sets up the amount of deposit on the amount banks, depresses his teller's receiving key which is white, the "deposit" key in the transaction bank and "deposit" key in the balance bank. The depression of the latter key releases the machine and during the first half operation thereof the two totalizer lines containing the plurality of individual totalizers are slid to position totalizers appropriate to the teller's receiving key and the "deposit" key in the transaction bank opposite the actuating teeth 110. The balance totalizer during the same time remains in its additive position. During the return movement of the differentially positioned teeth 110 the selected individual totalizers and the balance totalizer are moved into engagement with the said teeth 110 so that upon return movement thereof to normal position the amount set up on the amount keys is added on these engaged individual totalizers and the balance totalizer creating a new balance on the latter. The various type carriers are positioned as formerly described except that in this instance the amount type wheels between the plates 505 and 506 are slid by the drum 512 under the control of the "deposit" key in the balance bank to a position whereby they will print in the deposit column of the different printing mediums. The upper platen 362 is then actuated to make an impression on the detail strip and the lower platen 595 through the plate 615 and Geneva 600 is actuated to make two impressions, the first upon the deposit slip and the second upon the pass book. Just following the start of the machine the anti-friction roller 714 upon the arm 715 is lowered by the rocking of the shaft 784 to permit the knurled rollers 706 to come into contact with the knurled driving rollers 705. Subsequent to the impression made upon the deposit slip and previous to the one made by the platen 595 upon the pass book the plate 719 Geneva 722 and associated gears actuate the knurled driving rollers 705 to eject the deposit slip.

Following this operation the teller reinserts the ejected deposit slip and moves the total lever 5 one step to the reset position then depresses the "new balance" key in the transaction bank and the "balance" key in the balance bank. The depression of the latter key releases the machine and during the operation thereof the new balance standing upon the balance totalizer is set up on the type carriers 277 in the usual manner, those between the plates 505 and 506 however being slid to make an impression in the balance column of the pass book. The platen 362 is operated to make an impression upon the detail strip and the platen 595 to make an impression upon the pass book slip and an impression upon the pass book. The setting of the total lever 5 to its re-set position through the rack 278 positioned the type wheel 1277 to print a "Z" to indicate that the machine was re-set at the time the new balance was printed. The movement of the total lever also through the levers 736, 738 and 741 crippled the divided portion of the platen 595 so that an impression is not taken from the date type wheels 2781 during the second actuation of the platen 595.

The teller then returns the pass book to the depositor and after restoring the total lever 5 to its adding position sets up the amount of cash in the deposit upon the amount banks. He then depresses the "cash" key in the transaction bank and the "release" key in the balance bank. During the operation of the machine the amount of cash in the deposit is accumulated upon the cash individual totalizer and the same is printed upon the detail strip.

When a depositor wishes to withdraw an amount from his account he presents his pass book to the card clerk with a statement as to the amount he wishes to withdraw. The card clerk has a machine identical with the teller's machine which is described herein. The card clerk then takes from the card file the customer's ledger card and manipulates the machine as follows: He first sets up the depositor's account number with the handles 299 and the amount of the depositor's old balance upon the amount banks and operates the machine in the same manner as when a deposit is handled by the receiving teller. He then places the depositor's ledger card and pass book upon the table 675 the pass book being inserted to rest upon the lower stepped flange 684 and the ledger card upon the upper stepped flange 683. The amount keys to the amount of the withdraw, the card clerk's paying key which is blue and the "withdrawal" key in the balance bank are then depressed. The latter releases the machine and during the operation thereof the amount of the withdrawal is accumulated upon the selected individual totalizers appropriate to the card clerk's paying key and the zero position of the transaction bank, at which point the total withdrawal totalizer is located. At the same time the balance totalizer is shifted to its subtractive position and is actuated to create a new balance. After the various type wheels have been set under the control of the differential mechanisms and after those between the plates 505 and 506 have been slid under the control of the "withdrawal" key so that the withdrawal will be printed in the withdrawal column the platen 362 is actuated to print the amount upon the detail strip. The lower platen 595 is also actuated twice to make an impression first upon the ledger card and then upon the pass book, the ledger card being ejected previous to the second actuation of the said platen. The ledger card is then reinserted and the total lever moved one step to its re-set position. Upon depression of the "new balance key" in the transaction bank and "balance" key in the balance bank the machine is released and the total standing upon the balance totalizer is set up upon the type carriers which subsequently print the amount in the balance column of the ledger card and pass book.

The card clerk then gives the depositor in cash the amount of the withdrawal or may if the bank's system so requires present him with a check for the amount which the depositor signs and presents at the combined paying and receiving teller's window for payment. The teller takes the check, inserts it upon the table 675, sets up the amount thereof on the amount key banks and then depresses his teller's paying key which is blue, and the release key. The amount of the withdrawal is accumulated upon the teller's selected receiving individual totalizer and upon the total withdrawal totalizer located at the zero position of the transaction bank. Subsequently the amount is printed upon the detail strip and upon the check. In this operation although the sleeve 440 is set to cause two actuations of the platen 595, through the cam 475, levers 477, and 478, and pin 1445, the shaft 445 has been set by the depression of the release key so that the platen 595, will be actuated only once.

After banking hours the ledger cards of those accounts in which deposits have been made, as shown by deposit slips held by the receiving teller, are drawn from the files and the amount of the deposit of each account entered upon the ledger card in the usual manner, the ledger card being present upon the table 675 and the sleeve 440 being turned to its "1 print" position.

In order to determine the amount of business for the day, through the manipulation of the total lever 5 and depression of the various tellers' keys and keys in the transaction key bank the various totals may be printed upon the detail strip in the usual manner.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow:

What is claimed is:—

1. In a machine of the class described, the combination of a plurality of type carriers, a main operating mechanism, mechanism operated by the main operating mechanism for moving said type carriers differentially, manipulative means controlling the extent of movement of said mechanism, and means operated by the main operating mechanism for shifting the type carriers simultaneously with their actuation by the differential mechanism to print in different laterally spaced columns on record material.

2. In a machine of the class described, the combination of a plurality of type carriers, a main operating mechanism, actuators for moving said type carriers differentially, manipulative means controlling the extent of movement of the actuators, a cam operated by the main operating mechanism for shifting said type carriers simultaneously with their actuation by the differential mechanism to print in parallel columns on record material, and manipulative means controlling the extent of movement of said cam.

3. In a machine of the class described, the combination of a plurality of type carriers, a main operating mechanism, mechanism operated by the main operating mechanism for moving said type carriers differentially, manipulative means controlling the extent of movement of the said mechanism, means operated by the main operating mechanism for shifting the type carriers simultaneously with their actuation by the differential mechanism to print in different columns on a piece of record material, and manipulative means controlling the said shifting means.

4. In a machine of the class described, the combination of a plurality of type carriers, a main operating mechanism, mechanism operated by the main operating mechanism for moving said type carriers differentially, manipulative means controlling the extent of movement of the said mechanism, and means operated simultaneously with the differential positioning of the type carriers for shifting the said type carriers laterally with respect to their direction of movement as they are differentially positioned to print in different columns on record material.

5. In a machine of the class described, the combination of a plurality of type carriers, a main operating mechanism, differential mechanism adapted to actuate said type carriers, manipulative means controlling the extent of movement of the type carriers, and a cam operated by the main operating mechanism for shifting said type carriers laterally with respect to the characters thereon to print in different columns on record material said cam being operated simultaneously with the actuation of type carriers by the differential mechanism.

6. In a machine of the class described, the combination of a plurality of type carriers, a main operating mechanism, differential mechanism adapted to actuate said type carriers, manipulative means controlling the extent of movement of the type carriers, a cam operated by the main operating mechanism for shifting said type carriers laterally to print in parallel columns on record material, said cam operable simultaneously with the actuation of the type carriers by the differential mechanism, and keys controlling the operation of said cam.

7. In a machine of the class described, the combination of a plurality of rotatable and slidable type carriers, a main operating mechanism, differential mechanism operated by the said main operating mechanism for simultaneously differentially rotating the type carriers and sliding them to print in different columns on record material, and manipulative means controlling the actuation of the said differential mechanism.

8. In a machine of the class described, the combination of a main operating mechanism, a plurality of rotatable and slidable type carriers normally in printing relation with one column of record material, differential mechanism for rotating said type carriers, means operated by said differential mechanism for simultaneously shifting said type carriers to print in another column on the record material, and manipulative devices controlling the actuation of the said differential mechanism.

9. In a machine of the class described, the combination of a main operating mechanism, a subtracting totalizer, actuating means for the said totalizer, means operated by the main operating mechanism for moving the said totalizer into its additive and subtractive positions, a group of type carriers for printing in columns on record material, and means for shifting the type carriers into position to print in the column appropriate to the additive and subtractive positions of the totalizer.

10. In a machine of the class described, the combination of a main operating mechanism, a subtracting totalizer, actuating means therefor, means operated by the main operating mechanism for moving the subtracting totalizer into its subtractive and additive positions with relation to the actuating means, a group of type carriers for printing in columns on record material appropriate to the additive and subtractive positions of the totalizer, means for shifting the type carriers into positions to print in the column appropriate to the additive and subtractive position of the totalizer, and keys common to said selecting means for controlling the same.

11. In a machine of the class described, the combination of a main operating mechanism, a subtracting totalizer, actuators therefor, means operated by the main operating mechanism for moving the totalizer directly from one position to another selectively to bring it into either its additive or subtractive position with relation to the actuators, type carriers, means operated by the main operating mechanism for shifting the type carriers to different columns for printing on record material, the columns printed in being appropriate to the position occupied by the subtracting totalizer, and common means for controlling the totalizer moving means and the type carrier shifting means.

12. In a machine of the class described, the combination of a plurality of non-accumulating accounting elements, a main operating mechanism, mechanism operated by the main operating mechanism for moving said non-accumulating accounting elements differentially, manipulative means controlling the extent of movement of the non-accumulating accounting elements, and means operable simultaneously with the differential positioning of the non-accumulating accounting elements for shifting them laterally into different columnar positions.

13. In a machine of the class described, the combination of a plurality of non-accumulating accounting elements, a mechanism for moving said non-accumulating accounting elements differentially, manipulative means controlling the extent of movement of the non-accumulating accounting elements, a cam operable simultaneously with the differential positioning of the non-accumulating accounting elements for shifting them laterally into different columnar positions, and manipulative means controlling the operation of said cam.

14. In a machine of the class described, the combination of a main operating mechanism, an accumulating totalizer and a subtracting totalizer, differential actuators therefor, means for selectively positioning the accumulating totalizer and moving the subtracting totalizer into its additive and subtractive positions whereby amounts are simultaneously placed upon the said totalizers, a plurality of type carriers positioned commensurate with the actuation of the differential mechanism, and means for shifting the type carriers to different columnar positions for printing the amount listed on the accumulating totalizer and the total standing upon the subtracting totalizer.

15. In a machine of the class described, the combination of printing means, a normally effective impression device involving relatively movable portions co-operating with the face of the type, and means for moving a portion of said impression device relatively to another portion to render the first mentioned portion ineffective.

16. In a machine of the class described, type carriers, an impression device cooperating therewith, a portion of the said impression device movable into a plane below the plane of the remainder of the said device, and means controlled by the total lever for moving the said portion.

17. In a machine of the class described, type carriers, an impression device cooperating therewith, said impression device comprising a supporting member, a platen carried thereby, a portion of the supporting member and platen movable independent of the remaining portion, and means controlled by the total lever for moving said independent portion.

18. In a machine of the class described, the combination of a plurality of type carriers, a main operating mechanism, means operated by the main operating mechanism for moving said type carriers differentially, manipulative means controlling the extent of movement of the type carriers, a zero elimination mechanism, and means controlled during a total taking operation for preventing the zero elimination mechanism associated with one of the type carriers from being effective while permitting another zero elimination mechanism to be effective.

19. In a machine of the class described, the combination of a plurality of type carriers, a main operating mechanism, means operated by the main operating mechanism for moving said type carriers differentially, manipulative means for controlling the extent of movement of the type carriers, a zero elimination mechanism, and mean controlled by the total lever for preventing the zero elimination mechanism associated with one of the type carriers from being effective while permitting another zero elimination mechanism to be effective.

20. In a machine of the class described, the combination of a movable frame constructed to support two printing mediums one above the other, printing means for recording on the said printing mediums, impression means independent of said movable frame for first carrying one printing medium against the printing means and then the other printing medium against the said printing means, and a Geneva feed mechanism for removing the first printing medium before the second printing medium is carried against the said printing means.

21. In a machine of the class described, the combination of a carriage constructed to carry a card and a book, the card being placed above the book, printing means for recording on the card and the book, impression means for first carrying the card and then the book against the printing means, Geneva actuated means for removing the card before the book is carried against the printing means, and means upon which the carriage is adapted to be shifted to print in desired lines.

22. In a machine of the class described, the combination of a carriage constructed to to carry two printing mediums one arranged above the other, printing means for recording on the said printing mediums, impression means for first carrying one printing medium and then the other against the printing means, and means for removing the first printing medium before the second one is carried against the printing means, said means comprising feed rollers, and means controlled by the machine for engaging and disengaging the feed rollers.

23. In a machine of the class described, having a main operating mechanism, the combination of a carriage constructed to carry two printing mediums one placed above the other, printing means for recording on the two printing mediums, impression means for first carrying one printing medium and then the other against the printing means, means for removing the first printing medium before the second printing medium is carried against the printing means, said means comprising two sets of feeding elements, and means controlled by the main operating mechanism for engaging and disengaging the said feeding elements.

24. In a machine of the class described, the combination of a plurality of type carriers, a main operating mechanism, differential mechanism operated by the said main operating mechanism for simultaneously differentially moving the type carriers in one direction and for sliding them in a different direction to print in different colums on record material, and keys controlling the actuation of the said differential mechanism.

25. In a machine of the class described, the combination of a plurality of non-accumulating accounting elements, a mechanism for moving said non-accumulating accounting elements differentially, manipulative means controlling the extent of movement of the non-accumulating accounting elements, a cam operated by said mechanism simultaneously with the differential positioning of the non-accumulating accounting elements for shifting them laterally to different columnar positions, and keys controlling the operation of said cam.

26. In a machine of the class described, the combination of a plurality of type carriers, a main operating mechanism, differential mechanism actuated by said main operating mechanism, and means operated by said differential mechanism for simultaneously setting said type carriers and shifting them to print in parallel columns on record material.

27. In a machine of the class described, the combination of a plurality of type carriers, a main operating mechanism and means operated by the main operating mechanism for simultaneously setting said type carriers and shifting them to print in parallel columns on a single piece of record material.

28. In a machine of the class described, the combination of a plurality of rotatable and shiftable type carriers, a main operating mechanism, differential mechanism actuated by said main operating mechanism, manipulative devices controlling said differential mechanism and means operated by said differential mechanism for simultaneously rotating said type carriers and shifting them to print in different columns on record material commensurate with the actuated manipulative devices.

29. In a machine of the class described, the combination of a main operating mechanism, a subtracting totalizer, actuating means for the said totalizer, means operated by the main operating mechanism for moving the totalizer into its additive and subtractive positions, a group of type carrers for printing in columns on record material, and means for controlling the shifting of the type carriers for printing in columns on the record material appropriate to the additive and subtractive positions of the said totalizer.

30. In a machine of the class described, the combination of a main operating mechanism, a subtracting totalizer, actuating means for the said totalizer, means operated by the main operating mechanism for moving the totalizer into its additive and subtractive positions, a group of type carriers for printing in columns on record material, and means for shifting the type carriers to print in columns appropriate to the additive and subtractive positions of the said totalizer.

31. In a machine of the class described, the combination of a main operating mechanism, a subtracting totalizer, actuating means for the said totalizer, means operated by the main operating mechanism for moving the totalizer into its additive and subtractive positions, a group of type carriers for printing in columns on record material, means for causing the shifting of the type carriers for printing in columns on the record material appropriate to the additive and subtractive positions of the said totalizer, and common means for moving the totalizer into additive and subtractive positions and controlling the means for causing the shifting of the type carriers in relation to the printing medium.

32. In a machine of the class described, the combination of a main operating mechanism, a subtracting totalizer, actuating means therefor, means operated by the main operating mechanism for moving the subtracting totalizer into its additive and subtractive positions with relation to the said actuating means, a group of type carriers for printing in columns on record material appropriate to the additive and subtractive positions of the totalizer, means for the shifting type carriers for printing in said appropriate columns, and keys common to and controlling the said selecting means and the means for causing the shifting of the type carriers.

33. In a machine of the class described, the combination of a main operating mechanism, an accumulating totalizer and a subtracting totalizer differential actuators therefor, a plurality of type carriers, a printing medium and means for causing the shifting of the type carriers for printing the total on the accumulating totalizer and the total standing upon the subtracting totalizer in the appropriate columns on the printing medium.

34. In a machine of the class described, the combination of a main operating mechanism, an accumulating totalizer and a subtracting totalizer, differential actuators therefor, means for selectively positioning the accumulating totalizer and moving the subtractive totalizer into its additive and subtractive positions whereby amounts are simultaneously placed upon the said totalizers, a plurality of non-accumulating accounting elements positioned commensurate with the actuation of the differential mechanism, and means for shifting the non-accumulating accounting elements to different column positions for showing the amount listed on the accumulating totalizer and the total standing upon the subtracting totalizer.

35. In a machine of the class described, the combination of a main operating mechanism, a subtracting totalizer, actuating means therefor, means operated by the main operating mechanism for moving the subtracting totalizer into its subtractive and additive positions with relation to the actuating means, a group of type carriers for printing in columns on record material appropriate to the additive and subtractive positions of the totalizer, means for shifting the type carriers into positions to print in the columns appropriate to the additive and subtractive positions of the totalizer, and keys for controlling the said selecting means and said shifting means.

36. In a machine of the class described, the combination of a main operating mechanism, a subtracting totalizer, actuators therefor, means operated by the main operating mechanism for moving the totalizers directly from one position to another selectively to bring it into either its additive or subtractive position with relation to the actuators, type carriers, means operated by the main operating mechanism for shifting the type carriers to different columns for printing on record material, the columns printed in being appropriate to the positions occupied by the subtracting totalizer, and means for controlling the totalizer moving means and the type carrier shifting means.

37. In a machine of the class described, a main operating mechanism, type carriers, a normally effective impression device cooperating with the face of the type thereon, and means operable as a preliminary to an operation of the main operating mechanism during a total taking operation for rendering a portion of the said impression device ineffective.

38. In a machine of the class described, a main operating mechanism, type carriers, a normally effective impression device cooperating therewith, and means operable as a preliminary to an operation of the main operating mechanism during total and sub-total taking operations for rendering a portion of the said impression device ineffective.

39. In a machine of the class described, the combination of a plurality of type carriers, a main operating mechanism, means operated by the main operating mechanism for moving said type carriers differentially, manipulative means controlling the extent of movement of the type carriers, an impression device cooperating with said type carriers, manually set means for controlling said device whereby it may be controlled to be actuated twice during an operation of the machine, and means controlled by the manipulative means for permitting the impression device to only be actuated once.

40. In a machine of the class described, the combination of a plurality of type carriers, a main operating mechanism, means operated by the main operating mechanism for moving said type carriers differentially, manipulative means controlling the extent of movement of the type carriers, a plurality of impression devices cooperating with said type carriers, manually set means for controlling one of said devices whereby it may be controlled to be actuated twice during an operation of the machine, and means controlled by the manipulative means for permitting the said impression device to only be actuated once.

41. In a machine of the class described, the combination of printing means, a normally effective impression device cooperating therewith, a total lever adapted to be moved into any one of a plurality of positions each side of its normal position, and means cooperating with the impression device and operated by the total lever, when it is moved to any one of its various positions, for rendering a portion of said impression device ineffective.

42. In a machine of the class described, the combination of a movable frame constructed to support two printing mediums one above the other, printing means for recording on said printing mediums, impression means independent of said movable frame for carrying first one printing medium against the printing means and then the other printing medium against the printing means, means for removing the first printing medium before the second one is carried against the printing means, said means comprising two sets of feed rollers movable with said frame, and means controlled by the machine for engaging and disengaging the two sets of feed rollers.

43. In a machine of the class described, the combination of a movable frame constructed to support two printing mediums one above the other, printing means for recording on said printing mediums, impression means for carrying first one printing medium and then the other printing medium against the printing means, means for removing the first printing medium before the second one is carried against the printing means, said means comprising two sets of feed rollers so arranged that their relation to the movable frame is always the same regardless of the position to which said frame has been shifted, and means operated by the machine for engaging and disengaging the two sets of feed rollers when said frame is in normal position or after said frame has been shifted to any of its various positions.

44. In a machine of the class described, the combination of a main operating mechanism, a movable frame adapted to support two printing mediums one above the other, printing means for recording on said printing mediums, impressions means for carrying first one and then the other of said printing mediums against the printing means, means for removing the first printing medium before the second one is carried against the printing means, said means comprising two sets of feed rollers, one set mounted upon the movable frame and the other set mounted independent of said frame, but shiftable thereby, and means operated by the main operating mechanism for engaging and disengaging the two sets of feed rollers in any of their various positions.

45. In a machine of the class described, the combination of a movable frame constructed to support two printing mediums one above the other, printing means for recording on said printing mediums, impression means for carrying first one printing medium and then the other printing medium against the printing means, two sets of feed rollers for removing the first printing medium before the second one is carried against the printing means, driving means for one set of said rollers said rollers being slidably mounted upon said driving means, the other set of rollers being mounted upon said movable frame, means carried by said movable frame for moving said set of slidable rollers so as to maintain operating relation between both sets of rollers when said frame is shifted to any of its various positions, and means controlled by the machine for engaging and disengaging the two sets of feed rollers.

46. In a machine of the class described, the combination of a main operating mechanism, a subtracting totalizer, actuating means for said counter, means operated by the main operating mechanism for moving the totalizer into its additive or subtractive positions, a group of non-accumulating accounting elements for making columnar records on record material, and means for controlling the shifting of the non-accumulating accounting elements to make the record in the column of the record material appropriate to the additive and subtractive positions of the said totalizer.

47. In a machine of the class described, the combination of a main operating mechanism, a subtracting totalizer, actuating means for said totalizer, means operated by the main operating mechanism for moving the totalizer into its additive or subtractive positions, a group of non-accumulating accounting elements for making columnar records on record material, and means for shifting the non-accumulating accounting elements to make the record in the column of the record material appropriate to the additive and subtractive positions of the said totalizer.

48. In a machine of the class described, the combination of differentially rotatable record producing means shiftable to record in different columns on record material, and an operating means for simultaneously rotating and shifting said record producing means.

49. In a machine of the class described, the combination of an adjustable recording element, means cooperating therewith for producing records, means for adjusting said recording element and simultaneously shifting the same and the means cooperating therewith, relatively laterally to record in different columnar positions, and an operating means for actuating said second mentioned means.

50. In a machine of the class described, the combination of means for producing a plurality of records on record material during each operation of the machine, and differentially movable means operatively connected to said record producing means to control the same to print in corresponding positions on said record material.

51. In a machine of the class described, the combination of means for producing a plurality of records on record material during each operation of the machine, and differentially movable actuating means for moving and holding said record producing means to print in corresponding columnar positions on said record material.

52. In a machine of the class described, the combination of a laterally shiftable totalizer, laterally shiftable recording elements adapted to be set in accordance with the amount of change in the accumulated total in said totalizer, means shifting said totalizer, and means for shifting said recording elements laterally to record on record material in positions distinctive of the positions of said totalizer.

53. In a machine of the class described, the combination of recording elements, means involving a plurality of relatively movable members cooperating with said elements for producing a record on record material, and means moving said members relatively to each other to prevent one from being effective.

54. In a machine of the class described, the combination of recording elements, means cooperating therewith for producing records on record material, means for disabling said first mentioned means when no record material is in position to receive a record, and means for disabling a portion of said first mentioned means during certain operations of the machine.

In testimony whereof I affix my signature.

FREDERICK L. FULLER.